(12) United States Patent
Sugano

(10) Patent No.: US 12,209,514 B2
(45) Date of Patent: Jan. 28, 2025

(54) FLUID CONTROL VALVE UNIT AND VALVE TIMING CHANGING DEVICE

(71) Applicant: MIKUNI CORPORATION, Tokyo (JP)

(72) Inventor: Kouji Sugano, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/154,849

(22) Filed: Jan. 16, 2023

(65) Prior Publication Data

US 2023/0287809 A1    Sep. 14, 2023

(30) Foreign Application Priority Data

Mar. 10, 2022    (JP) .................. 2022-037619

(51) Int. Cl.
*F01L 1/344* (2006.01)
*F16K 11/07* (2006.01)
(Continued)

(52) U.S. Cl.
CPC ............ *F01L 1/3442* (2013.01); *F16K 11/07* (2013.01); *F16K 27/041* (2013.01);
(Continued)

(58) Field of Classification Search
CPC ...................... F01L 1/3442; F01L 1/047; F01L 2001/34426; F01L 1/356;
(Continued)

(56) References Cited

U.S. PATENT DOCUMENTS 8,534,246 B2 * 9/2013 Lichti .................. F01L 1/3442
123/90.15
8,567,360 B2 * 10/2013 Bayrakdar ............ F01L 1/3442
123/90.15

(Continued)

FOREIGN PATENT DOCUMENTS

DE    102013104031 A1 * 10/2014 .............. F01L 1/344
EP    2466081 A1 * 6/2012 .............. F01L 1/344
(Continued)

OTHER PUBLICATIONS

WO 2020196404, English Language Machine Translation (Year: 2020).*

*Primary Examiner* — Wesley G Harris
(74) *Attorney, Agent, or Firm* — JCIPRNET

(57) ABSTRACT

A fluid control valve unit includes: a fluid control valve including a sleeve in a bottomed cylindrical shape defining an axis, and a spool slidably accommodated in the sleeve in a direction of the axis; a cylindrical passage member including an inner peripheral surface to which the sleeve is fitted, a receiving part for receiving an end of the sleeve in the direction of the axis, and an annular groove recessed from the inner peripheral surface; and a snap ring including a notch with a predetermined gap and fitted in the annular groove to be capable of restricting the fluid control valve accommodated in the passage member from falling off in the (Continued)

direction of the axis and to be capable of discharging fluid flowing through a discharge passage formed in the passage member.

13 Claims, 28 Drawing Sheets

(51) Int. Cl.
*F16K 27/04* (2006.01)
*F16K 31/06* (2006.01)
*F16K 31/48* (2006.01)

(52) U.S. Cl.
CPC .......... *F16K 31/0613* (2013.01); *F16K 31/48* (2013.01); *F01L 2001/34426* (2013.01); *F01L 2001/3443* (2013.01); *F01L 2001/34433* (2013.01); *F01L 2001/3444* (2013.01)

(58) Field of Classification Search
CPC .............. F01L 2001/34433; F01L 1/46; F01L 2001/34423; F01L 2001/3443; F16K 31/48; F16K 31/52483
See application file for complete search history.

(56) References Cited

U.S. PATENT DOCUMENTS

| | | | | |
|---|---|---|---|---|
| 8,863,710 | B2* | 10/2014 | Bayrakdar | F16K 11/0716 |
| | | | | 123/90.17 |
| 8,910,603 | B2* | 12/2014 | Bayrakdar | F01L 1/3442 |
| | | | | 123/90.17 |
| 9,206,714 | B2* | 12/2015 | Koehler | F01L 1/3442 |
| 9,695,716 | B2* | 7/2017 | Smith | F01L 1/3442 |
| 9,957,853 | B2* | 5/2018 | Haltiner, Jr. | F01L 1/3442 |
| 10,309,271 | B2* | 6/2019 | Hoppe | F01L 1/344 |
| 2007/0095315 | A1* | 5/2007 | Hoppe | F01L 1/34 |
| | | | | 123/90.17 |
| 2014/0311333 | A1* | 10/2014 | Hutzelmann | F01L 1/3442 |
| | | | | 91/418 |

FOREIGN PATENT DOCUMENTS

| | | | | |
|---|---|---|---|---|
| EP | 3530891 A1 * | 8/2019 | | F01L 1/02 |
| JP | 2020128785 | 8/2020 | | |
| WO | WO-2015141245 A1 * | 9/2015 | | F01L 1/047 |
| WO | WO 2020196404 * | 10/2020 | | F01L 1/022 |

* cited by examiner

FLUID CONTROL VALVE UNIT AND VALVE TIMING CHANGING DEVICE

CROSS-REFERENCE TO RELATED APPLICATION

This application claims the priority benefit of Japan application serial no. 2022-037619, filed on Mar. 10, 2022. The entirety of the above-mentioned patent application is hereby incorporated by reference herein and made a part of this specification.

BACKGROUND

Technical Field

The disclosure relates to a fluid control valve unit and a valve timing changing device for an internal combustion engine using the fluid control valve unit.

Description of Related Art

A conventional fluid control valve unit is known which includes a cylindrical outer sleeve having a hydraulic oil passage and opening at both ends, a bottomed cylindrical inner sleeve having an inlet for inflow of hydraulic oil and an outlet for outflow of hydraulic oil and inserted into the outer sleeve, a spool inserted into the inner sleeve in a reciprocally movable manner, a biasing spring that biases the spool in one direction of movement, a filter member fitted to the inner wall surface of one end of the outer sleeve, and a cap-shaped engagement member fitted to the inner wall surface of the other end of the outer sleeve, and the like. (See, for example, Patent Literature 1).

In this fluid control valve unit, the filter member is fitted to the inner wall surface of the outer sleeve, the inner sleeve is inserted into the outer sleeve to contact the filter member, and the biasing spring and the spool are inserted into the inner sleeve; in this state, the engagement member is fitted to the inner wall surface of the outer sleeve to sandwich and fix the inner sleeve together with the filter member to prevent the spool from coming off.

Here, it is necessary that the engagement member sandwiches and fixes the inner sleeve, restricts the spool from coming off, and discharges excess hydraulic oil in the outer sleeve to the outside.

However, since the engagement member and the filter member are fitted to the inner wall surface of the outer sleeve, there is a risk that the engagement member or the filter member may come off due to impact due to the reciprocating movement of the spool or changes over time. Further, there is a possibility that the hydraulic oil may not be discharged smoothly depending on the mounting state of the engagement member where the form is not clear.

RELATED ART

Patent Literature

[Patent Literature 1] Japanese Patent Application Laid-Open No. 2020-128785

SUMMARY

Technical Problem

The disclosure has been made in view of the above circumstances, and the disclosure provides a fluid control valve unit and a valve timing changing device using the fluid control valve unit capable of simplifying the structure, reducing the number of parts, improving functional reliability, ensuring smooth operation, and achieving desired functions.

Solution to Problem

A fluid control valve unit according to the disclosure includes: a fluid control valve including a sleeve in a bottomed cylindrical shape defining a predetermined axis, and a spool slidably accommodated in the sleeve in a direction of the axis; a cylindrical passage member including an inner peripheral surface to which the sleeve is fitted, a receiving part for receiving an end of the sleeve in the direction of the axis, and an annular groove recessed from the inner peripheral surface; and a snap ring including a notch with a predetermined gap and fitted in the annular groove to be capable of restricting the fluid control valve accommodated in the passage member from falling off in the direction of the axis and to be capable of discharging fluid flowing through a discharge passage formed in the passage member.

The above-described fluid control valve unit may adopt a configuration in which the passage member includes a positioning recess for positioning the sleeve around the axis, and the sleeve includes the discharge passage for discharging fluid and a positioning protrusion that is fitted into the positioning recess, and the snap ring includes an opening through which fluid passes and a fitting protrusion that is fitted into the positioning recess so that the opening corresponds to the discharge passage.

The above-described fluid control valve unit may adopt a configuration in which the snap ring includes an annular receiving part that receives the sleeve and a protruding receiving part that protrudes radially inward from the annular receiving part and detachably receives the spool.

The above-described fluid control valve unit may adopt a configuration in which the snap ring includes two holes near two ends defining the notch for inserting an installation tool, and the opening is defined by the notch and the two holes.

The above-described fluid control valve unit may adopt a configuration in which the sleeve includes a first groove passage and a second groove passage formed extending in the direction of the axis in an outer wall to define the discharge passage.

The above-described fluid control valve unit may adopt a configuration in which the sleeve includes a communication recess in the outer wall that causes the first groove passage and the second groove passage to communicate with each other in a circumferential direction to define the discharge passage.

The above-described fluid control valve unit may adopt a configuration which further includes a filter member sandwiched between the end of the sleeve and the receiving part.

The above-described fluid control valve unit may adopt a configuration in which the snap ring is formed in a flat plate shape extending in a direction perpendicular to the axis.

The above-described fluid control valve unit may adopt a configuration in which the sleeve includes an inlet through which fluid flows, and a first communication port and a second communication port located on two sides of the inlet in the direction of the axis, and the spool includes a rod that reciprocates within the sleeve, a first valve portion that is provided on the rod to open and close a passage between the inlet and the first communication port, a second valve portion that is provided on the rod to open and close a passage between the inlet and the second communication port, and a biasing spring that exerts a biasing force in a direction to bring the first valve portion into contact with the snap ring.

The above-described fluid control valve unit may adopt a configuration in which the discharge passage includes a first discharge passage that communicates with the first communication port and is able to discharge fluid when the first valve portion is closed and that communicates with the second communication port and is able to discharge fluid when the second valve portion is closed, and a second discharge passage that communicates with a region where the biasing spring is disposed and is able to discharge fluid.

The above-described fluid control valve unit may adopt a configuration in which the spool includes a compression spring disposed between the first valve portion and the second valve portion; the first valve portion includes a first fixed part fixed to the rod and having a first land capable of closing the first communication port and a first internal passage formed inside the first land, and a first movable part movably supported along the rod and having a first lid part for opening and closing the first internal passage; the second valve portion includes a second fixed part fixed to the rod and having a second land capable of closing the second communication port and a second internal passage formed inside the second land, and a second movable part movably supported along the rod and having a second lid part for opening and closing the second internal passage; and the compression spring is disposed to exert a biasing force to close the first lid part and to close the second lid part.

A valve timing changing device according to the disclosure is a valve timing changing device for changing opening and closing timing of an intake valve or an exhaust valve driven by a camshaft, and the valve timing changing device includes: a housing rotor that rotates coaxially with the camshaft; a vane rotor that defines an advance chamber and a retard chamber together with the housing rotor and that rotates integrally with the camshaft; and a fluid control valve unit as described above for controlling supply and discharge of hydraulic oil with respect to the advance chamber and the retard chamber, and the fluid control valve unit includes a sleeve having an inlet, a first communication port and a second communication port, and a spool having a first valve portion and a second valve portion. The inlet of the fluid control valve unit is a supply port to which hydraulic oil is supplied. The first communication port of the fluid control valve unit is a retard port that communicates with the retard chamber. The second communication port of the fluid control valve unit is an advance port that communicates with the advance chamber.

The above-described valve timing changing device may adopt a configuration which further includes a fastening bolt that fastens the vane rotor to the camshaft, and the fastening bolt is the passage member of the fluid control valve unit.

The above-described valve timing changing device may adopt a configuration in which the fluid control valve of the fluid control valve unit is a torque-driven and hydraulically-driven fluid control valve capable of reciprocating hydraulic oil between the retard chamber and the advance chamber by a fluctuating torque received by the camshaft and discharging a part of the supplied hydraulic oil.

The above-described valve timing changing device may adopt a configuration in which the spool is formed so that in a state where the spool is positioned in a retard mode in which the first valve portion is opened and the second valve portion is closed, when the camshaft receives a reverse torque, the second valve portion opens to allow hydraulic oil to flow from the advance port to the retard port, and in a state where the spool is positioned in an advance mode in which the first valve portion is closed and the second valve portion is opened, when the camshaft receives a forward torque, the first valve portion opens to allow hydraulic oil to flow from the retard port to the advance port.

The above-described valve timing changing device may adopt a configuration in which the spool is formed to block reciprocation of hydraulic oil between the retard chamber and the advance chamber in a state of being positioned in a neutral holding mode in which the first valve portion closes the retard port and the second valve portion closes the advance port.

Effects

According to the fluid control valve unit with the above configurations, the simplification of the structure, the reduction in the number of parts, and the improvement in functional reliability may be achieved, and smooth operation may be ensured, and desired functions may be achieved. Further, according to the valve timing changing device including the fluid control valve unit with the above configurations, it is possible to achieve a desired operation without causing a malfunction of the fluid control valve while achieving miniaturization of the device, smoothly discharging excess hydraulic oil, and the like.

DESCRIPTION OF EMBODIMENTS

Hereinafter, embodiments of the disclosure will be described with reference to the accompanying drawings.

Figure 1:
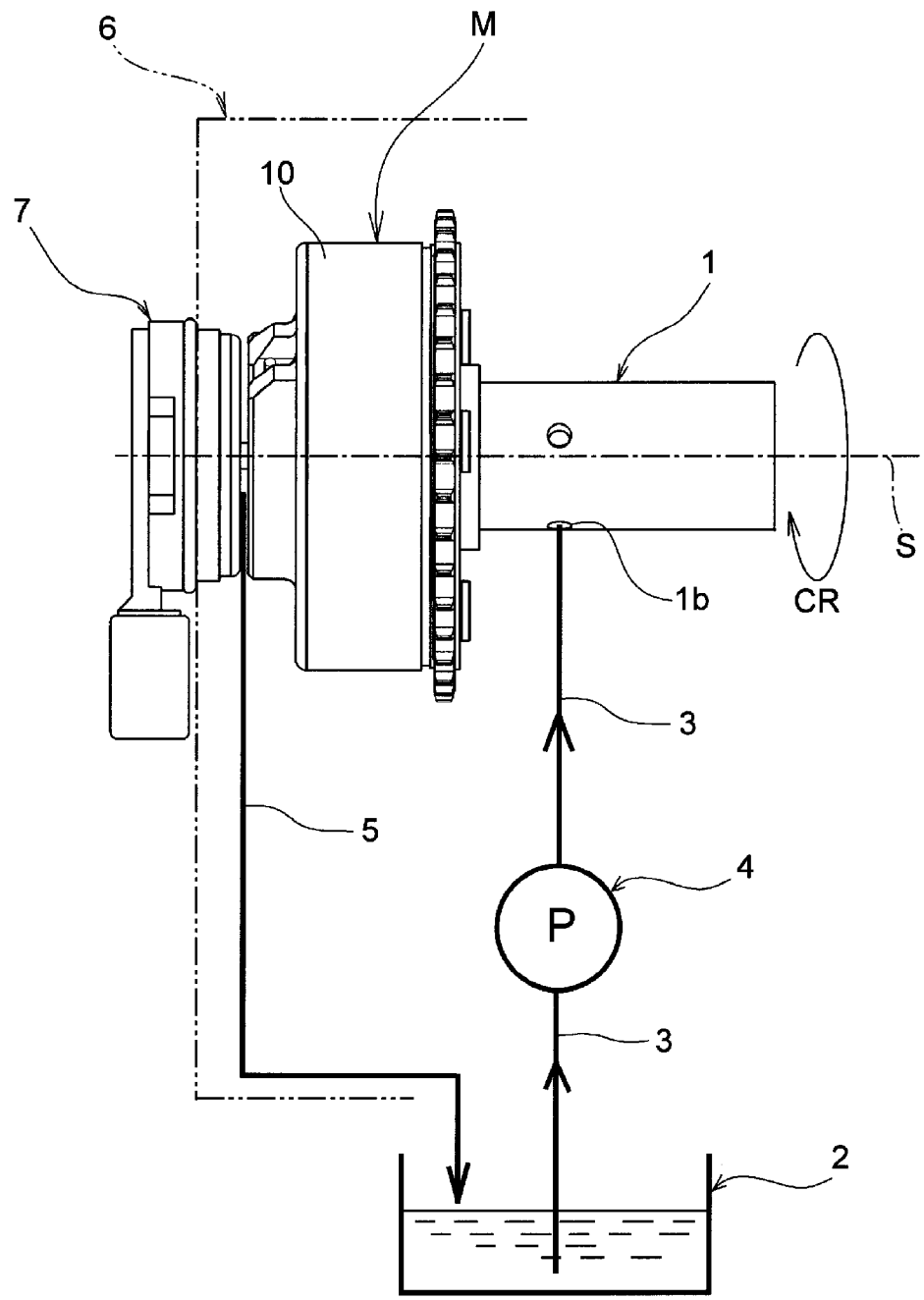
FIG. 1 is a schematic view showing the configuration of an engine to which a valve timing changing device including a fluid control valve of the disclosure is applied.
Figure 2:
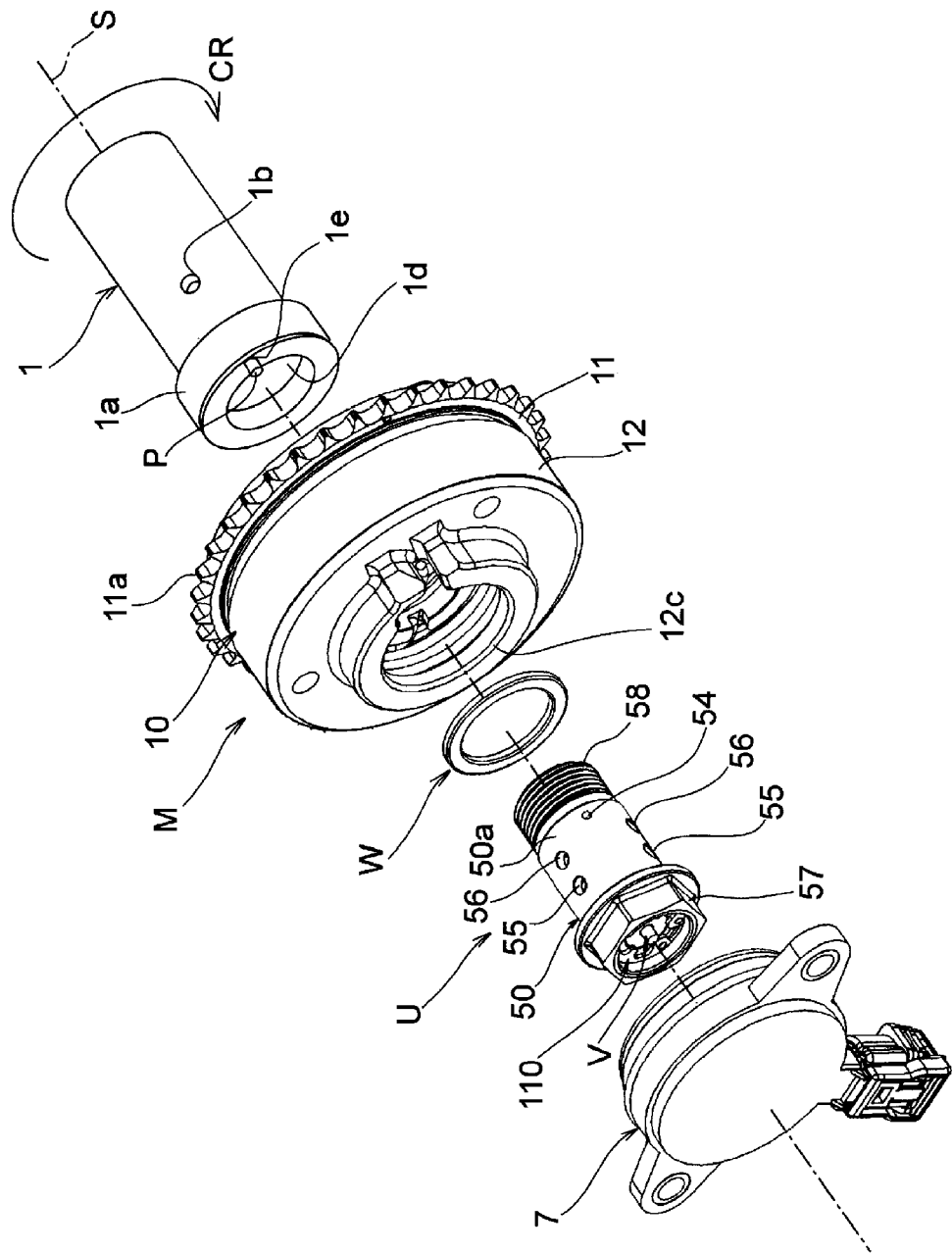
FIG. 2 is an exploded perspective view of the electromagnetic actuator, the fastening bolt with the built-in fluid control valve, the valve timing changing device, and the camshaft in the configuration shown in FIG. 1, as viewed obliquely from the front opposite to the camshaft side.

A valve timing changing device M including a fluid control valve V according to the disclosure, as shown in FIG. 1, is attached to a camshaft 1 of an internal combustion engine and changes the opening/closing timing, that is, the valve timing, of an intake valve or an exhaust valve driven by the camshaft 1.

The internal combustion engine includes the camshaft 1 that opens and closes an intake valve or an exhaust valve; an oil pan 2 that stores hydraulic oil; a supply passage 3 that supplies the hydraulic oil in the oil pan 2 toward the camshaft 1; an oil pump 4 provided in the middle of the supply passage 3 for sucking, pressurizing and discharging the hydraulic oil; a discharge passage 5 that returns hydraulic oil discharged from the fluid control valve V to the oil pan 2; a chain cover 6 that covers the valve timing changing device M; and an electromagnetic actuator 7 fixed to the chain cover 6.

The camshaft 1, as shown in FIGS. 1 to 7, rotates about an axis S in one direction CR, and includes a fitting shaft 1a, passages 1b and 1c, a female screw part 1d, and a fitting hole 1e into which a positioning pin P is fitted.

The supply passage 3 is formed in the cylinder block, cylinder head, and the like of the internal combustion engine.

The discharge passage 5 is defined between the cylinder block and cylinder head of the internal combustion engine and the chain cover 6 to return excess hydraulic oil discharged from the fluid control valve V back to the oil pan 2.

Figure 3:
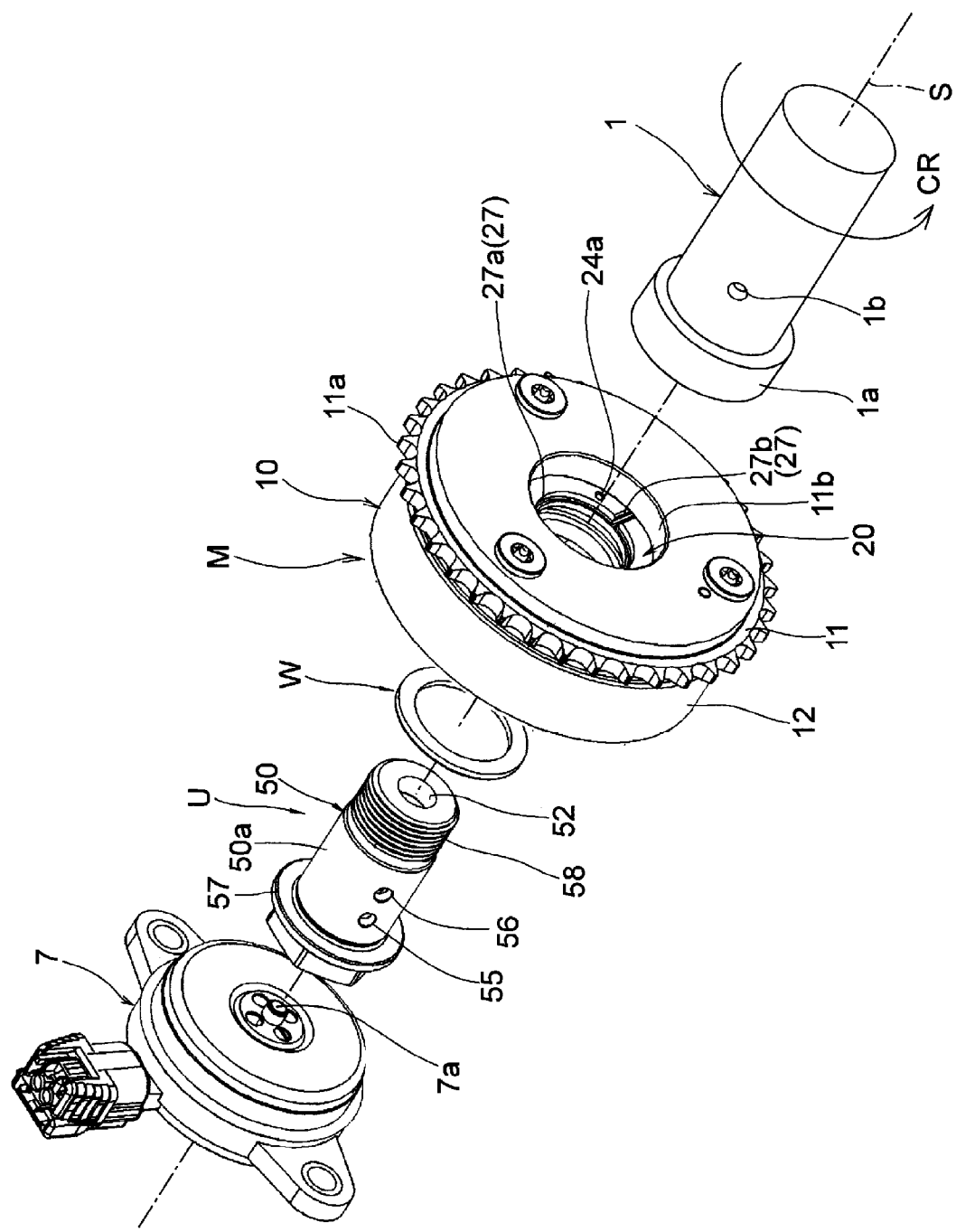
FIG. 3 is an exploded perspective view of the electromagnetic actuator, the fastening bolt with the built-in fluid control valve, the valve timing changing device, and the camshaft in the configuration shown in FIG. 1, as viewed obliquely from the back on the camshaft side.

The electromagnetic actuator 7 is fixed to the chain cover 6 and, as shown in FIG. 3, includes a drive shaft 7a that moves in the direction of the axis S and an excitation coil (not shown) that drives the drive shaft 7a.

As shown in FIGS. 2 to 7, the valve timing changing device M includes a housing rotor 10, a vane rotor 20, a rotation biasing spring 30, a lock mechanism 40, and a fluid control valve unit U.

The fluid control valve unit U includes a fastening bolt 50 as a passage member, a filter member 60, a fluid control valve V disposed in the fastening bolt 50, and a snap ring 110.

The fluid control valve V switches passages to control the flow of hydraulic oil, and includes a sleeve 70, a spool 80, a biasing spring 90, and a check valve 100.

The housing rotor 10 is rotatably supported on the axis S of the camshaft 1, interlocks with the rotation of the crankshaft via a chain, and transmits the rotational driving force of the crankshaft to the camshaft 1 via the vane rotor 20.

As shown in FIGS. 4 to 7, the housing rotor 10 has a two-piece structure including a disk-shaped first housing 11 and a bottomed cylindrical second housing 12 coupled to the first housing 11. The housing rotor 10 accommodates the vane rotor 20 to be relatively rotatable in the angle range between the most retarded position and the most advanced position, and defines an advance chamber AC and a retard chamber RC together with the vane rotor 20.

The first housing 11 includes a sprocket 11a, a fitting hole 11b, an inner wall surface 11c, a lock hole 11d, a recess 11e formed continuously with the lock hole 11d, three circular holes 11f through which screws b pass, and a positioning hole 11g into which a positioning pin $P_2$ is fitted.

The fitting hole 11b is rotatably fitted to the fitting shaft 1a of the camshaft 1. The inner wall surface 11c is in slidable contact with a back surface 24 of the vane rotor 20. A lock pin 41 of the lock mechanism 40 is fitted into the lock hole 11d with a small gap. The recess 11e is formed around the lock hole 11d and guides hydraulic oil to a tip pressure receiving part 41a of the lock pin 41 fitted in the lock hole 11d.

As shown in FIGS. 4 to 7, the second housing 12 includes a cylindrical wall 12a, a front wall 12b, an opening 12c, three screw holes 12d into which screws b are screwed, three shoe parts 12e, a hooking groove 12f, a recess 12g, an annular joint part 12h joined to the inner wall surface 11c of the first housing 11, and a positioning hole 12i into which the positioning pin $P_2$ is fitted.

The opening 12c forms a circular hole centered on the axis S through which the fastening bolt 50 is passed.

The three shoe parts 12e are formed on the inside of the front wall 12b to protrude from the cylindrical wall 12a toward the center and are disposed at equal intervals in the circumferential direction.

One shoe part 12e contacts the vane 22 of the vane rotor 20 to define the maximum retarded position, and another shoe part 12e contacts the vane 22 of the vane rotor 20 to define the maximum advanced position.

The hooking groove 12f is formed by cutting out a part of the opening 12c to hook a first end 32 of the rotation biasing spring 30. A part of a coil part 31 of the rotation biasing spring 30 is accommodated in the recess 12g.

The vane rotor 20 is disposed inside the housing rotor 10, defines the advance chamber AC and the retard chamber RC together with the housing rotor 10, is fixed to the camshaft 1 with the fastening bolt 50 with a washer W therebetween, and rotates integrally with the camshaft 1.

As shown in FIGS. 4 to 7, the vane rotor 20 includes a hub 21, three vanes 22, a front surface 23, an annular recess 23a, a hooking groove 23b, a back surface 24, a fitting hole 25, a recess 26, a groove passage 27, a retard passage 28, and an advance passage 29.

The vane 22 defines the advance chamber AC and the retard chamber RC together with the shoe part 12e of the housing rotor 10. The front surface 23 is disposed in slidable contact with the inner wall surface of the front wall 12b of the second housing 12. The annular recess 23a is formed by hollowing out the front surface 23 in an annular shape to accommodate a part of the coil part 31 of the rotation biasing spring 30. The hooking groove 23b is formed by hollowing out a part of the front surface 23 to hook a second end 33 of the rotation biasing spring 30 thereon.

The back surface 24 is formed on a plane perpendicular to the axis S, is joined to the end surface of the camshaft 1, and is disposed in slidable contact with the inner wall surface 11c of the first housing 11. Further, the back surface 24 is provided with a fitting hole 24a into which a positioning pin P to be assembled in the fitting hole 1e of the camshaft 1 is fitted. The fitting hole 25 is formed to have an inner diameter dimension such that a cylindrical part 50a of the fastening bolt 50 is closely fitted.

Figure 5:
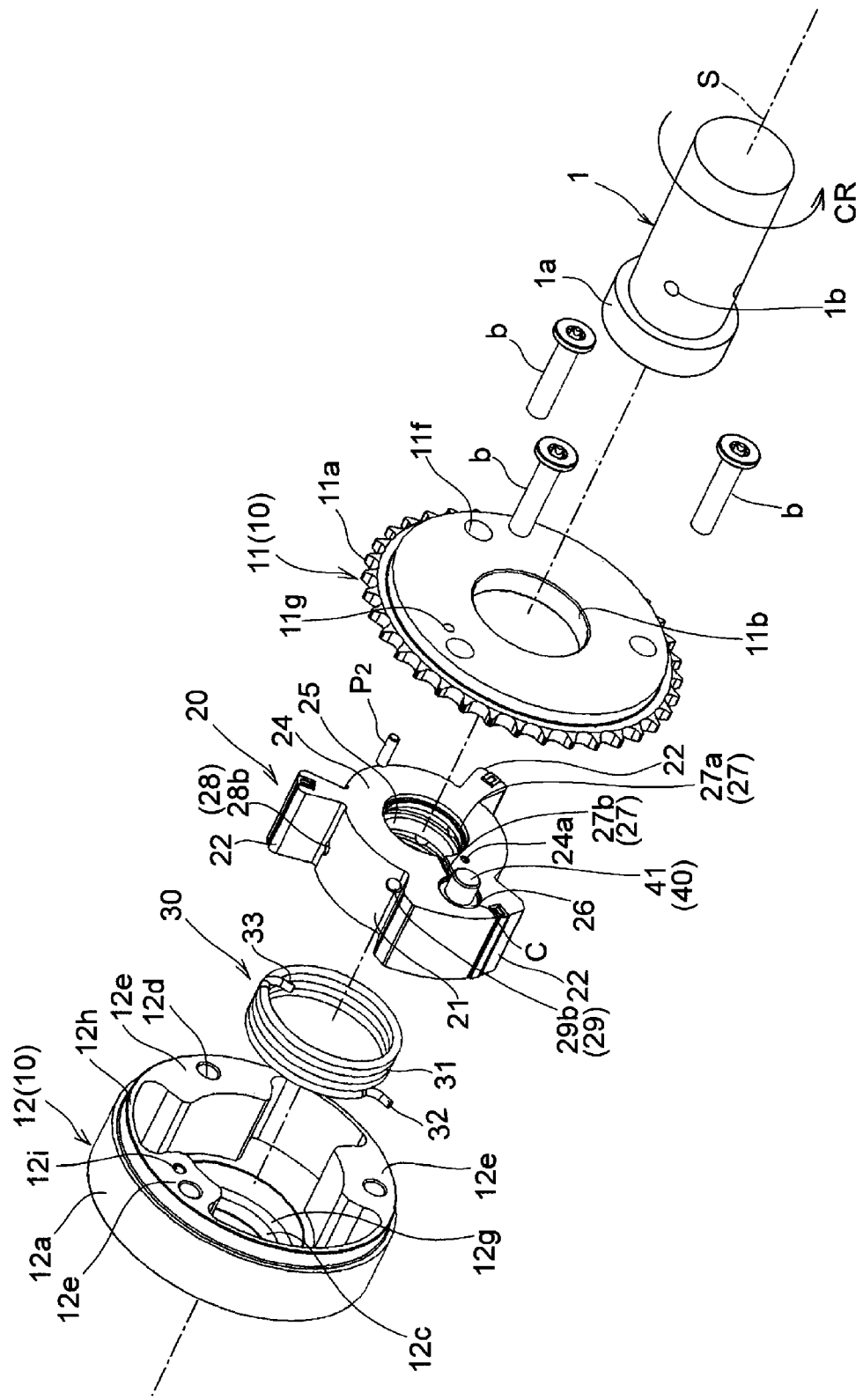
FIG. 5 is an exploded perspective view of the housing rotor, the vane rotor, the rotation biasing spring, and the camshaft included in the valve timing changing device of the disclosure, as viewed obliquely from the back on the camshaft side.
Figure 6:
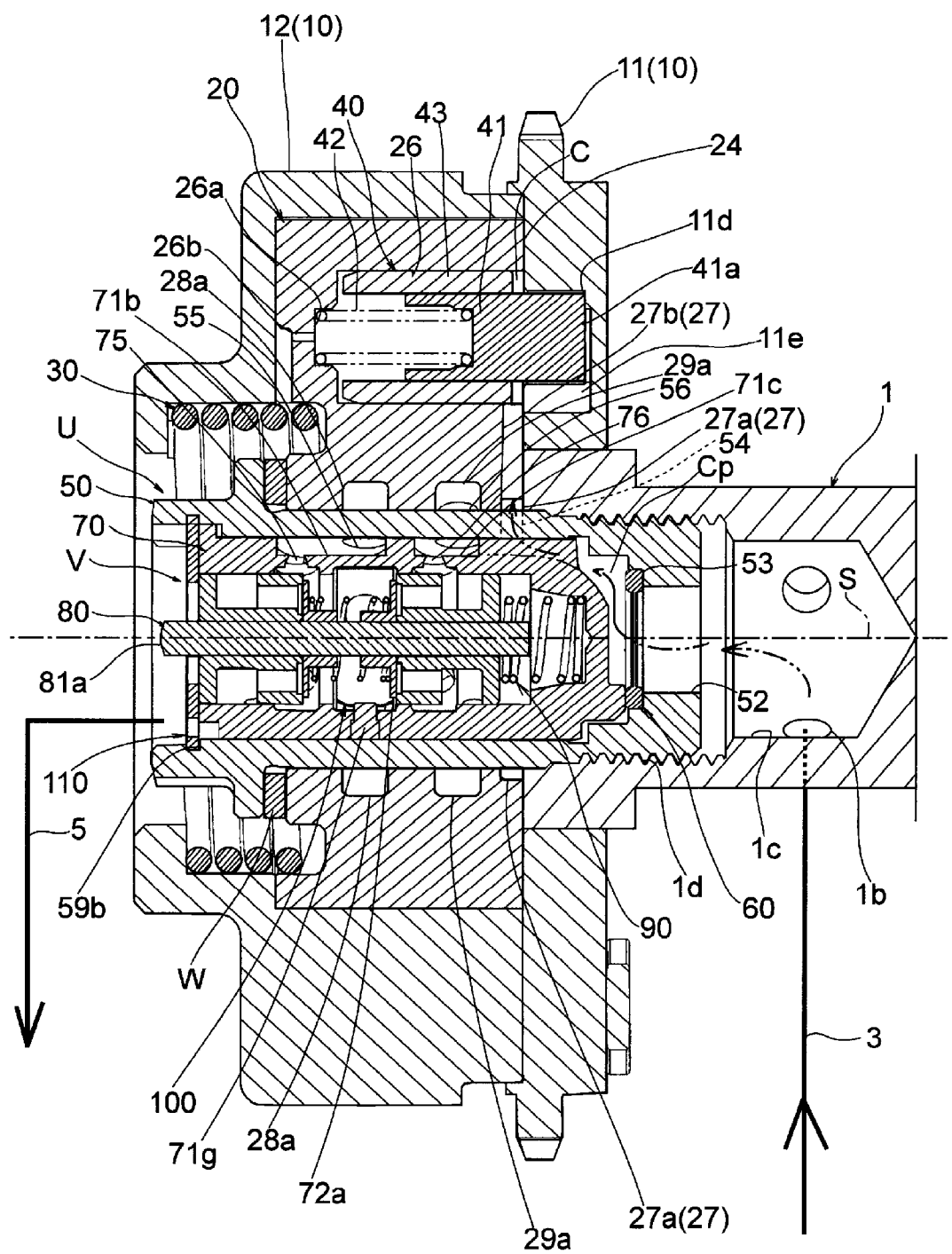
FIG. 6 is a cross-sectional view showing a locked state in which the lock mechanism is operated in a state in which the valve timing changing device of the disclosure is fastened and fixed to the camshaft by the fastening bolt.
Figure 7:
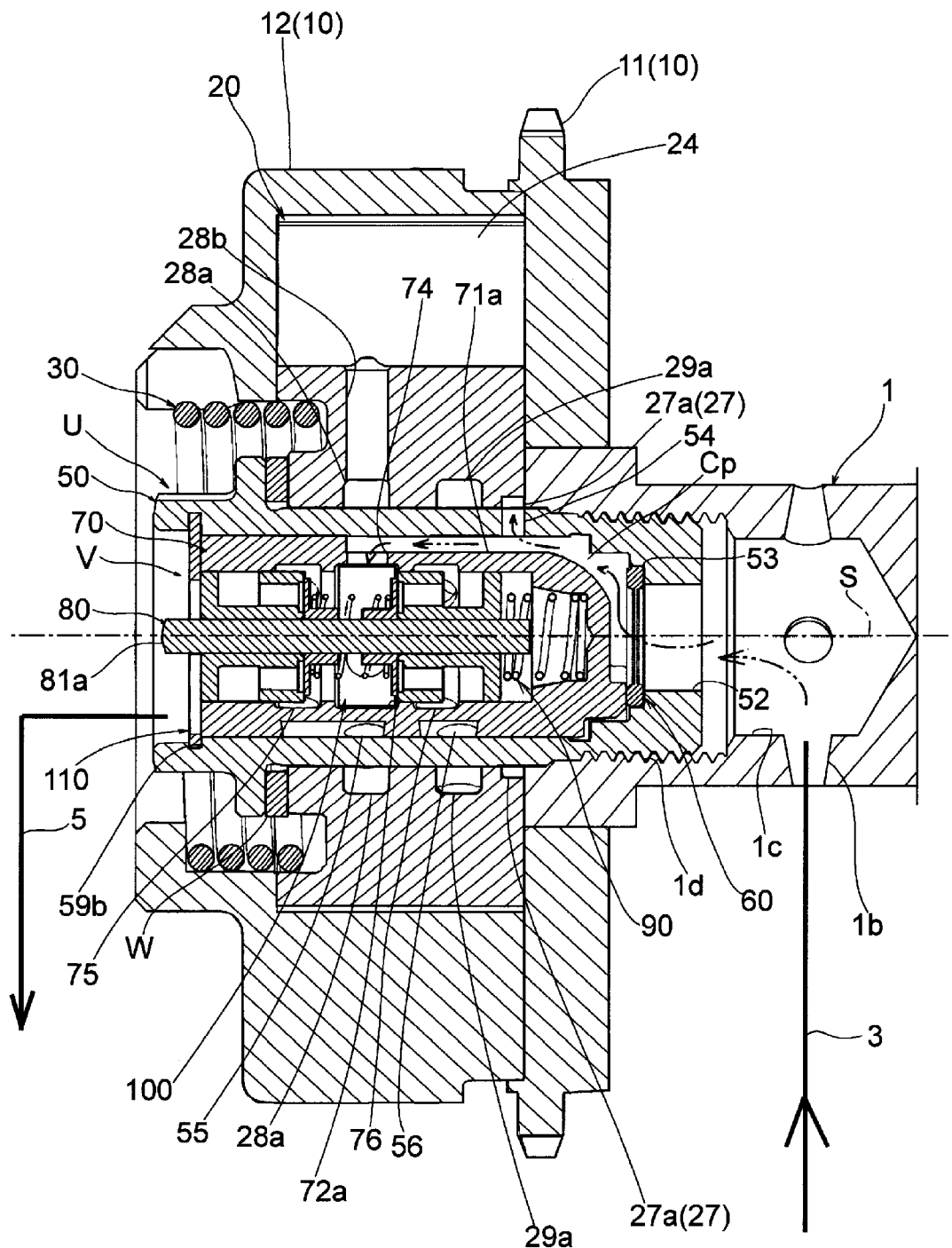
FIG. 7 is a cross-sectional view showing a passage in the region around the fluid control valve in a state in which the valve timing changing device of the disclosure is fastened and fixed to the camshaft by the fastening bolt.
Figure 8:
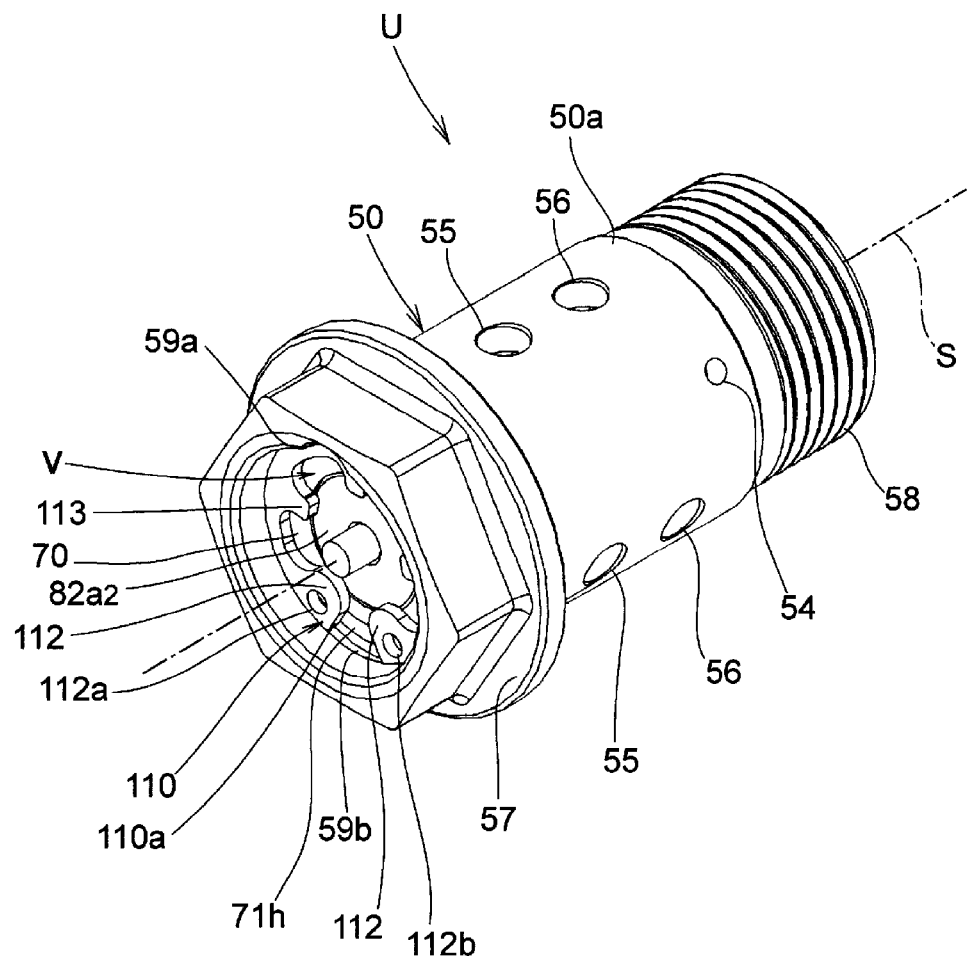
FIG. 8 is an external perspective view showing the fluid control valve unit of the disclosure.
Figure 9:
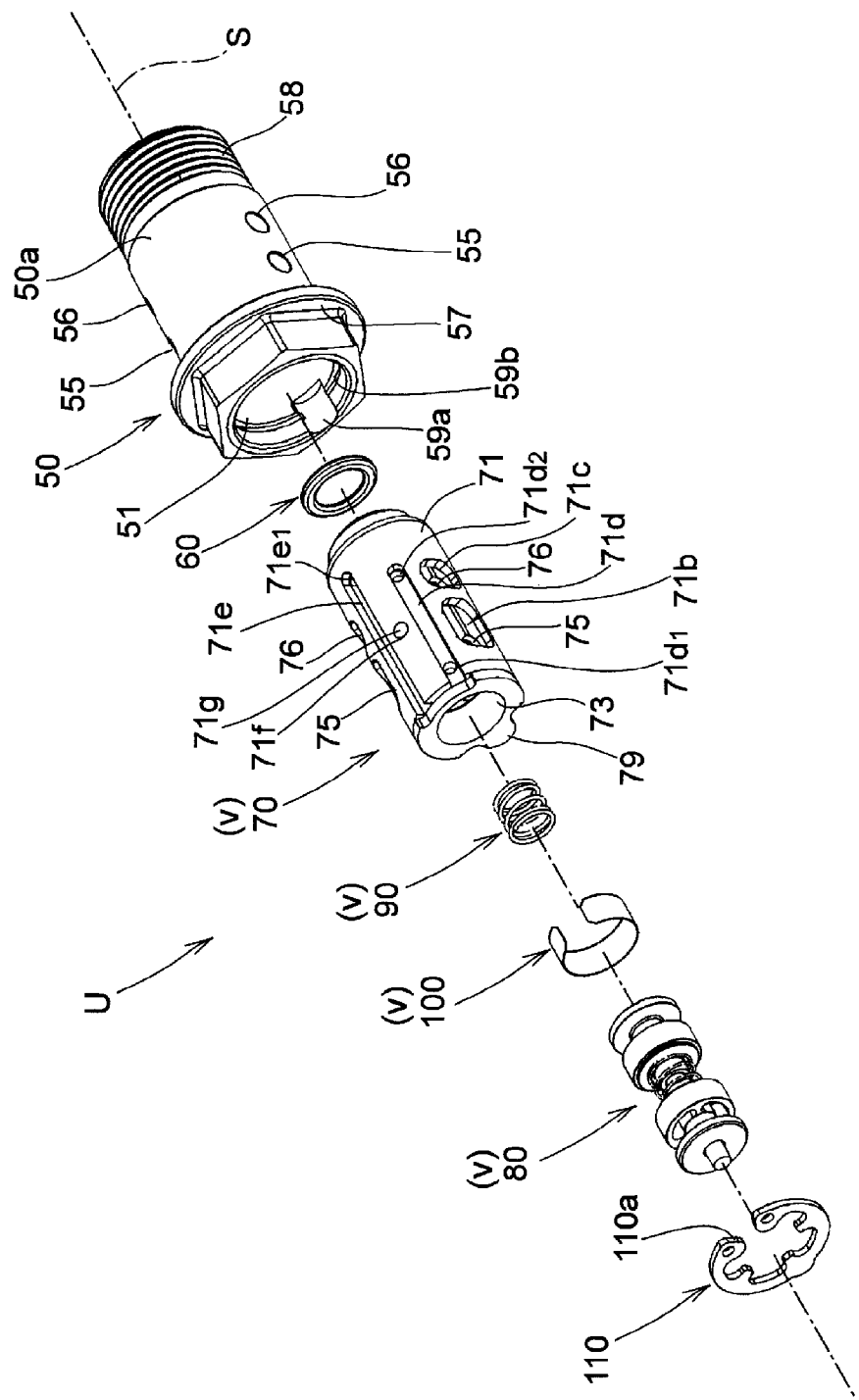
FIG. 9 is an exploded perspective view of the fluid control valve unit shown in FIG. 8, as viewed obliquely from the front opposite to the camshaft side to which the valve timing changing device is attached.

As shown in FIGS. 5 and 6, the recess 26 is formed in one vane 22 to accommodate the lock mechanism 40, and includes a receiving part 26a for receiving a biasing spring 42 included in the lock mechanism 40, and a communication passage 26b communicating with the outside of the vane rotor 20.

The groove passage 27 is formed by an annular groove passage 27a and a straight groove passage 27b, and cooperates with the end surface of the camshaft 1 and the inner wall surface 11c of the housing rotor 10 to supply hydraulic oil to and discharge hydraulic oil from the lock mechanism 40. That is, the groove passage 27 serves to supply the hydraulic oil guided through a through passage 54 of the fastening bolt 50 to the lock mechanism 40 upstream of the fluid control valve V in the flow direction of the supplied hydraulic oil to release the lock and to discharge the hydraulic oil when locking. Since the groove passage 27 is formed in the back surface 24 of the vane rotor 20, it is easy to machine and provides lubrication to the sliding region of the inner wall surface 11c.

Figure 21:
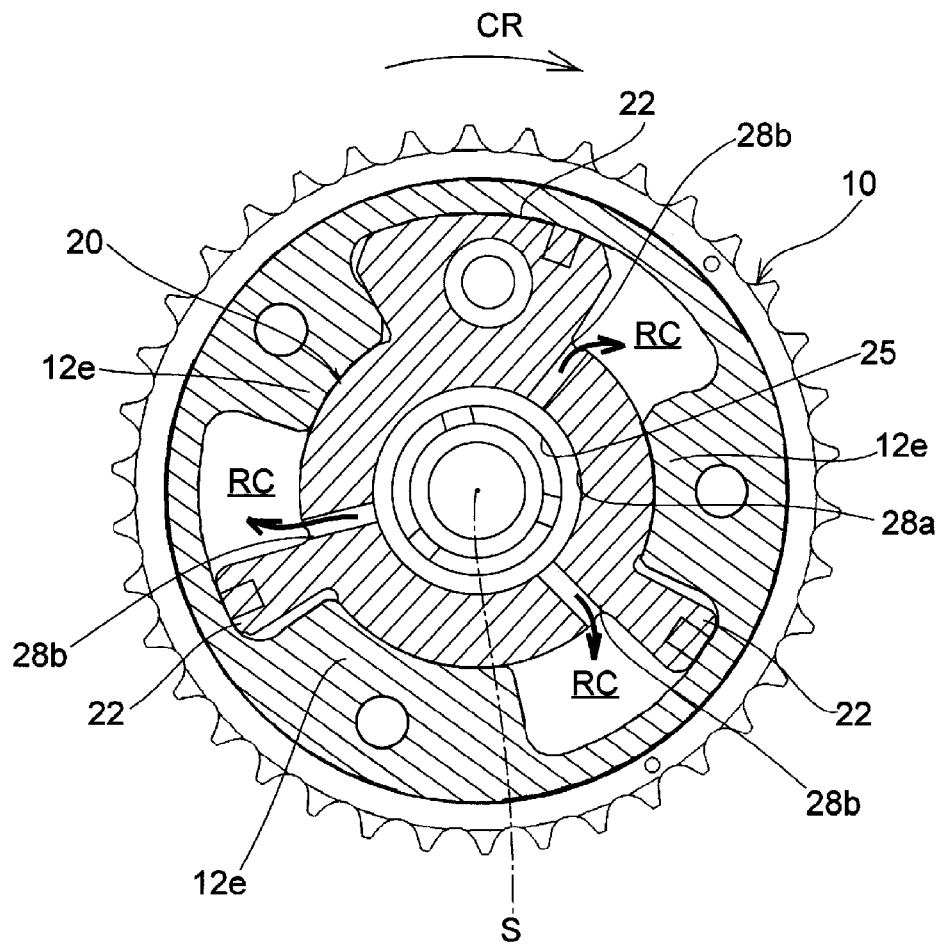
FIG. 21 is a cross-sectional view showing a state in which the vane rotor is positioned at the most retarded position with respect to the housing rotor.

The retard passage 28 supplies and discharges hydraulic oil to and from the retard chamber RC, and as shown in FIG. 21, is formed by an annular groove 28a formed in the inner peripheral surface of the fitting hole 25 and a through passage 28b radially penetrating the hub 21 from the annular groove 28a.

Figure 22:
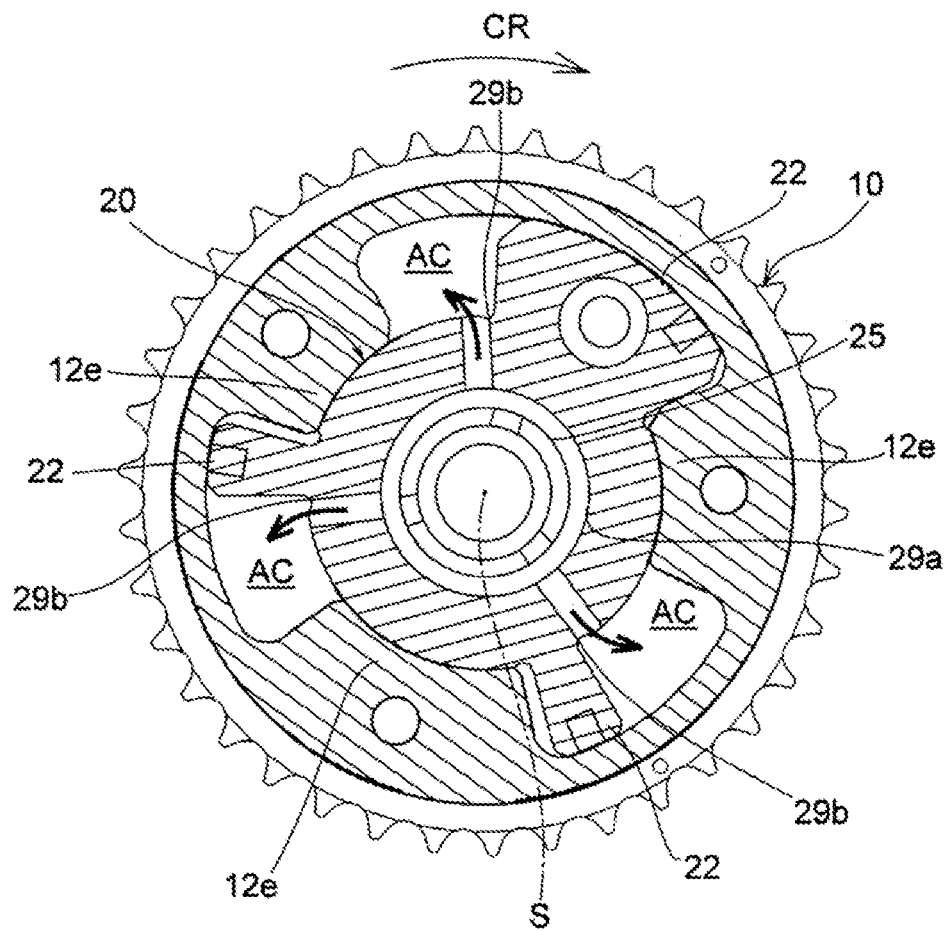
FIG. 22 is a cross-sectional view showing a state in which the vane rotor is positioned at the most advanced position with respect to the housing rotor.

The advance passage 29 supplies and discharges hydraulic oil to and from the advance chamber AC, and as shown in FIG. 22, is formed by an annular groove 29a formed in the inner peripheral surface of the fitting hole 25 and a through passage 29b radially penetrating the hub 21 from the annular groove 29a.

Figure 4:
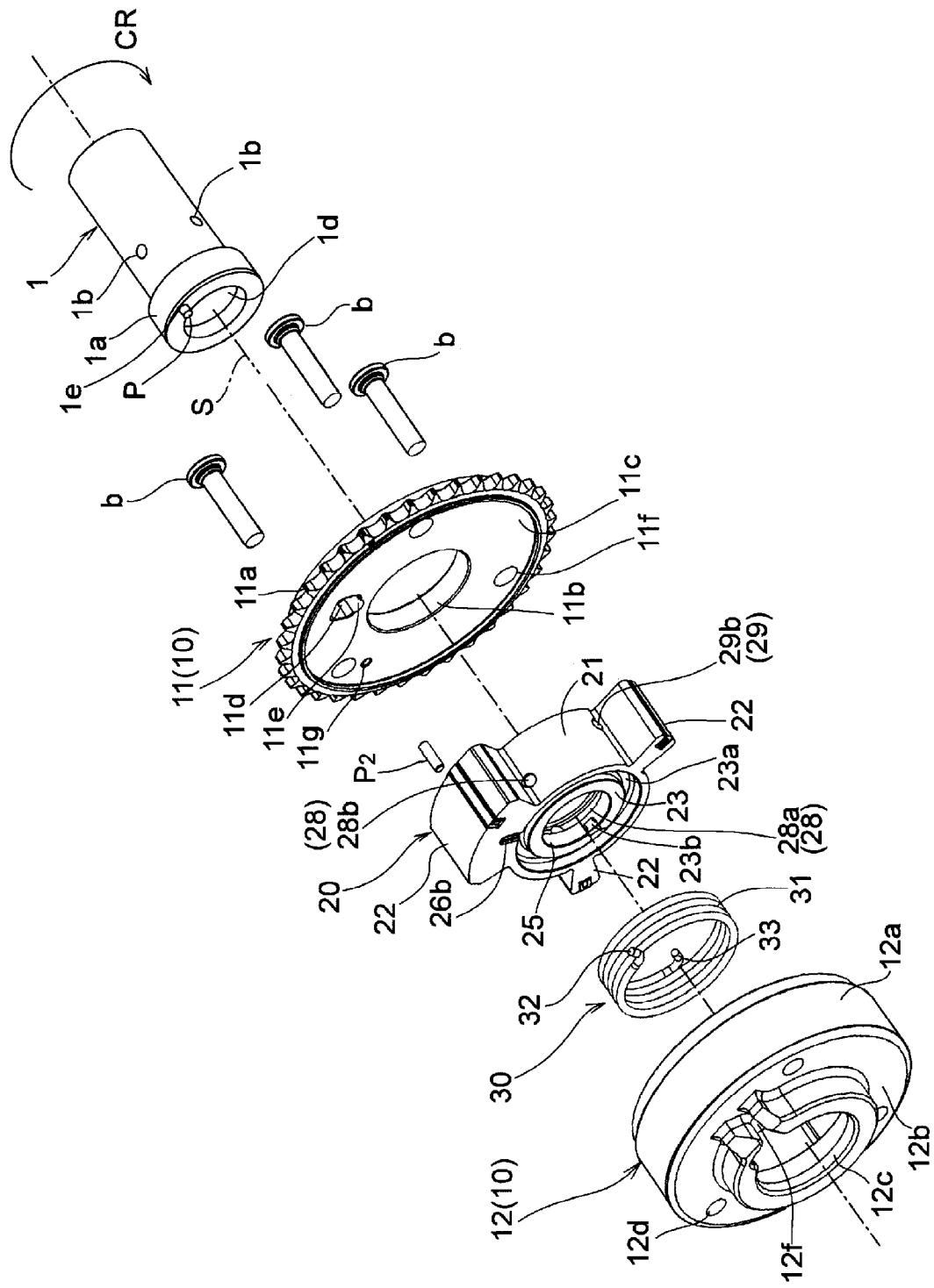
FIG. 4 is an exploded perspective view of the housing rotor, the vane rotor, the rotation biasing spring, and the camshaft included in the valve timing changing device of the disclosure, as viewed obliquely from the front opposite to the camshaft side.

The rotation biasing spring 30 is a coil spring including a coil part 31, a first end 32 and a second end 33, as shown in FIGS. 4 to 6.

The coil part 31 of the rotation biasing spring 30 is accommodated in the annular recess 23a of the vane rotor 20 and the recess 12g of the housing rotor 10, and the first end 32 is hooked by the hooking groove 12f of the housing rotor 10, and the second end 33 is hooked by the hooking groove 23b of the vane rotor 20. Thereby, the rotation biasing spring 30 rotationally biases the vane rotor 20 with respect to the housing rotor 10 in the advancing direction.

In this way, by adopting the rotation biasing spring 30 that biases in the advancing direction, it is possible to improve the responsiveness by assisting the operating torque when advancing. Further, controllability may be improved by setting the load of the rotation biasing spring 30 so that the difference between the operating torque and the load torque is substantially equal when advancing and retarding.

Figure 20:
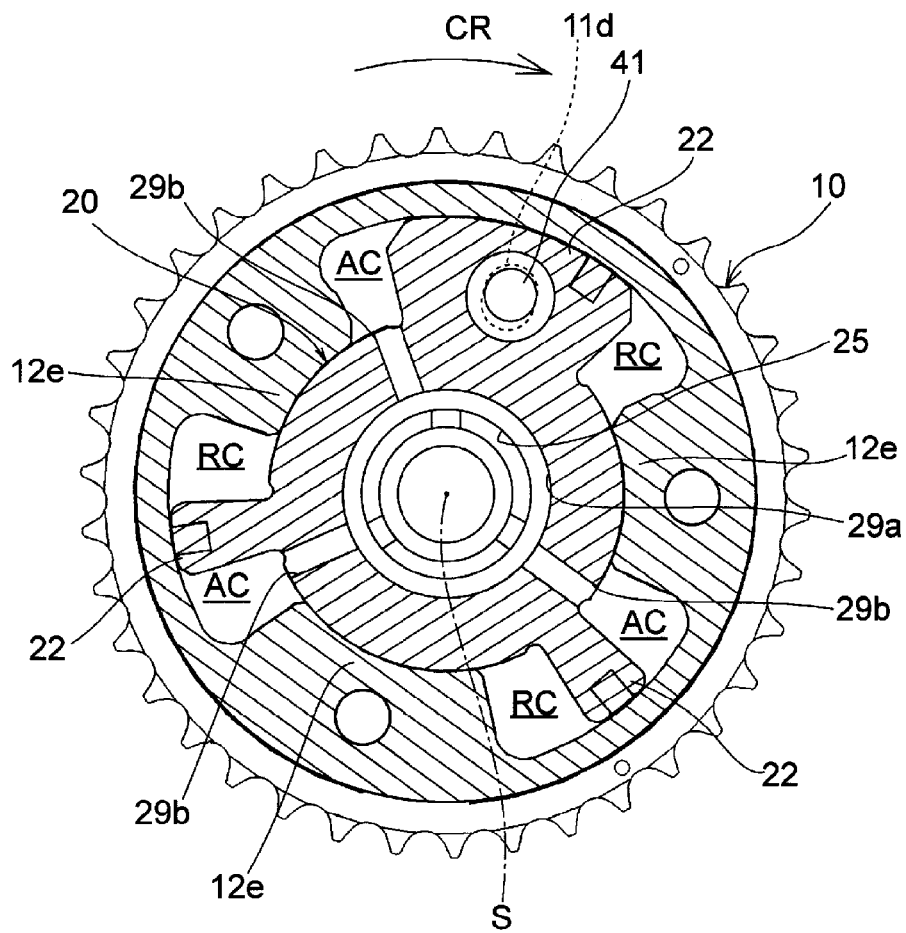
FIG. 20 is a cross-sectional view showing a state in which the vane rotor is locked in an intermediate position with respect to the housing rotor.

The lock mechanism 40 includes a lock pin 41, a biasing spring 42, and a cylindrical holder 43. As shown in FIG. 20, the lock mechanism 40 locks the vane rotor 20 with respect to the housing rotor 10 at an intermediate position between the most retarded position and the most advanced position.

The lock pin 41 has a substantially cylindrical shape and has a tip pressure receiving part 41a. The lock pin 41 is held in the direction of the axis S with respect to the back surface 24 of the vane rotor 20 to be retractable to fit into the lock hole 11d of the housing rotor 10. The biasing spring 42 biases the lock pin 41 in a protruding direction.

The cylindrical holder 43 is fitted and fixed in the recess 26 of the vane rotor 20 to reciprocally hold the lock pin 41 biased by the biasing spring 42. Further, as shown in FIGS. 5 and 6, the cylindrical holder 43 is disposed to be recessed from the back surface 24 of the vane rotor 20 to define an annular oil reservoir C communicating with the straight groove passage 27b around the lock pin 41. By providing the annular oil reservoir C, the region around the lock pin 41 is filled with hydraulic oil, and the lock may be released smoothly.

When the engine is started, hydraulic oil pressurized by the oil pump 4 is guided to the lock mechanism 40 through the passages 1b and 1c of the camshaft 1, a crevice passage $C_p$ in the fastening bolt 50, the through passage 54 of the fastening bolt 50, the groove passage 27 and the annular oil reservoir C formed in the back surface 24 of the vane rotor 20, and when the hydraulic pressure applied to the tip pressure receiving part 41a of the lock pin 41 increases, the lock pin 41 is released from the lock hole 11d to release the lock.

In addition, when the hydraulic pressure of the supplied hydraulic oil decreases due to the engine stop, the hydraulic oil acting on the lock pin 41 flows out through the groove passage 27, the through passage 54, the crevice passage $C_p$, and the passages 1c and 1b, and the hydraulic pressure pressing the lock pin 41 decreases. Then, the lock pin 41 is biased by the biasing spring 42 to fit into the lock hole 11d of the housing rotor 10, and the vane rotor 20 is locked to the intermediate position with respect to the housing rotor 10.

As shown in FIGS. 2, 3 and 6 to 10, the fastening bolt 50 includes a cylindrical part 50a centered on the axis S, an inner peripheral surface 51 for fitting the fluid control valve V, an opening 52, an annular receiving part 53, a through passage 54, a retard passage 55, an advance passage 56, a flanged head 57, a male screw part 58, a positioning recess 59a, and an annular groove 59b.

The cylindrical part 50a is formed to have an outer diameter dimension that allows it to be closely fitted into the fitting hole 25 of the vane rotor 20. The inner peripheral surface 51 forms a cylindrical surface with the axis S as the center. The opening 52 is formed in a circular hole with a diameter smaller than that of the inner peripheral surface 51 and functions as a passage through which hydraulic oil passes.

The receiving part 53 is annularly formed inside the opening 52 and receives an end 70a of the sleeve 70 via the filter member 60 in the direction of the axis S.

As described above, since the fastening bolt 50 has the receiving part 53 integrally formed to receive the fluid control valve V (the end 70a of the sleeve 70), by simply fitting the snap ring 110 on the opposite side, it is possible to prevent the fluid control valve V from moving in the direction of the axis S and falling off with a simple structure.

The through passage 54 introduces or discharges hydraulic oil to or from the lock mechanism 40, and penetrates in a radial direction perpendicular to the axis S in the cylindrical part 50a.

The retard passage 55 extends through the cylindrical part 50a in a radial direction perpendicular to the axis S to communicate with the retard passage 28 of the vane rotor 20.

The advance passage 56 extends through the cylindrical part 50a in a radial direction perpendicular to the axis S to communicate with the advance passage 29 of the vane rotor 20.

The flanged head 57 contacts the front surface 23 of the vane rotor 20 with the washer W therebetween. The male screw part 58 is screwed onto the female screw part 1d of the camshaft 1.

The positioning recess 59a is formed so that a positioning protrusion 79 of the sleeve 70 included in the fluid control valve V and a fitting protrusion 114 of the snap ring 110 are fitted.

The annular groove 59b is formed adjacent to the inner peripheral surface 51 and recessed from the inner peripheral surface 51 so that the snap ring 110 is fitted therein.

The filter member 60 catches foreign matter mixed in the hydraulic oil supplied by the oil pump 4, and is sandwiched between the receiving part 53 and the end of the sleeve 70 inside the fastening bolt 50.

The fluid control valve V switches passages to supply or discharge hydraulic oil to the advance chamber AC and the retard chamber RC, and as shown in FIGS. 9, 10 and 12 to 14, includes a sleeve 70, a spool 80, a biasing spring 90 and a check valve 100.

As shown in FIGS. 9, 10 and 12 to 18, the sleeve 70 is formed in a bottomed cylindrical shape using aluminum or other metal material, and includes an end 70a, an outer wall 71, thinned parts 71a, 71b and 71c, a first groove passage 71d and through passages $71d_1$ and $71d_2$ as a first discharge passage forming a part of the discharge passage, a second groove passage 71e and a through passage $71e_1$ as a second discharge passage forming a part of the discharge passage, a fitting hole 71f, a fitting pin 71g, a communication recess 71h forming a part of the discharge passage, an inner peripheral surface 72, annular grooves 72a, 72b and 72c, an opening 73, a supply port 74, a retard port 75, an advance port 76, a stopper wall 77, a spring receiving part 78 and a positioning protrusion 79.

Figure 10:
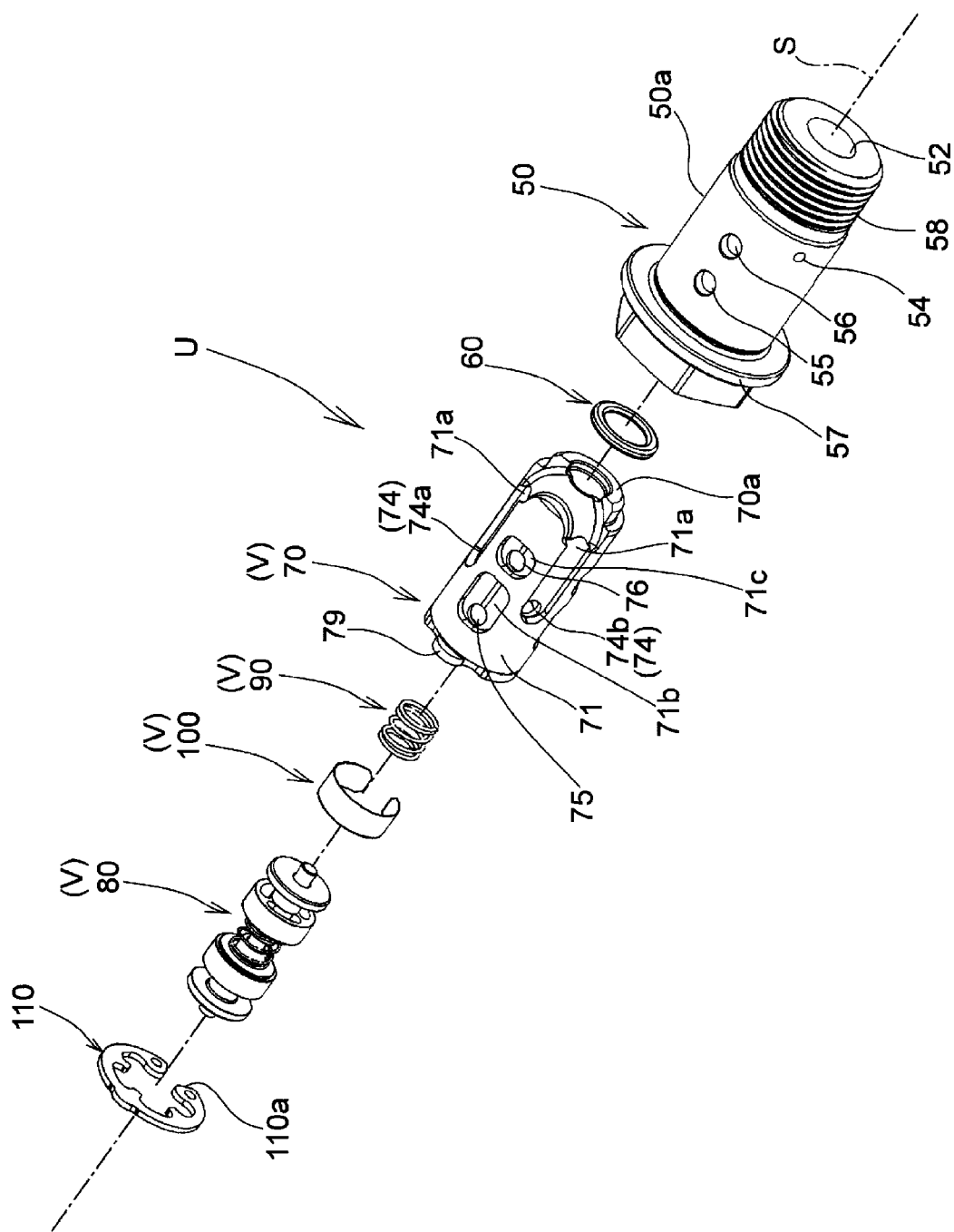
FIG. 10 is an exploded perspective view of the fluid control valve unit shown in FIG. 8, as viewed obliquely from the back on the camshaft side to which the valve timing changing device is attached.
Figure 13:
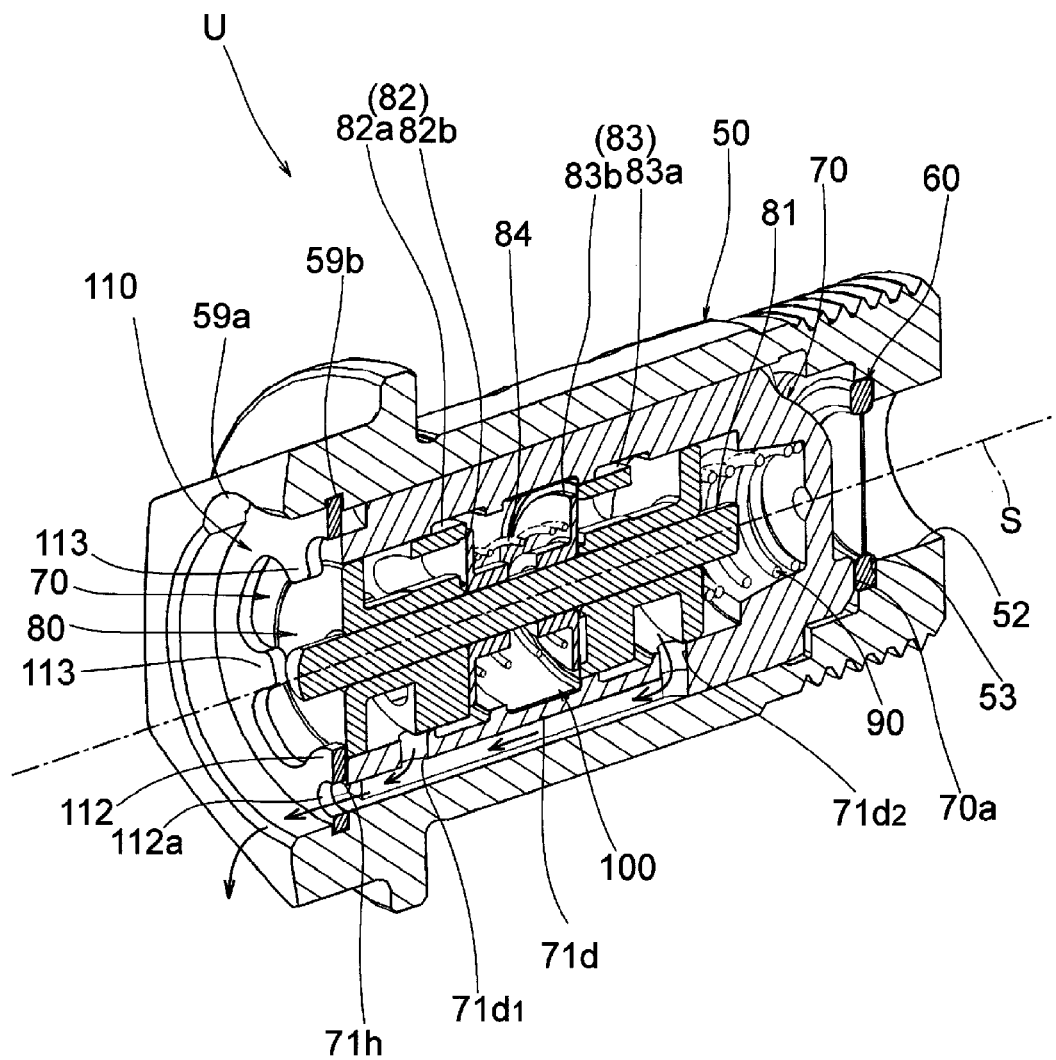
FIG. 13 shows the fluid control valve unit of the disclosure, and is a perspective cross-sectional view cut along a plane passing through a first discharge passage (first groove passage).
Figure 14:
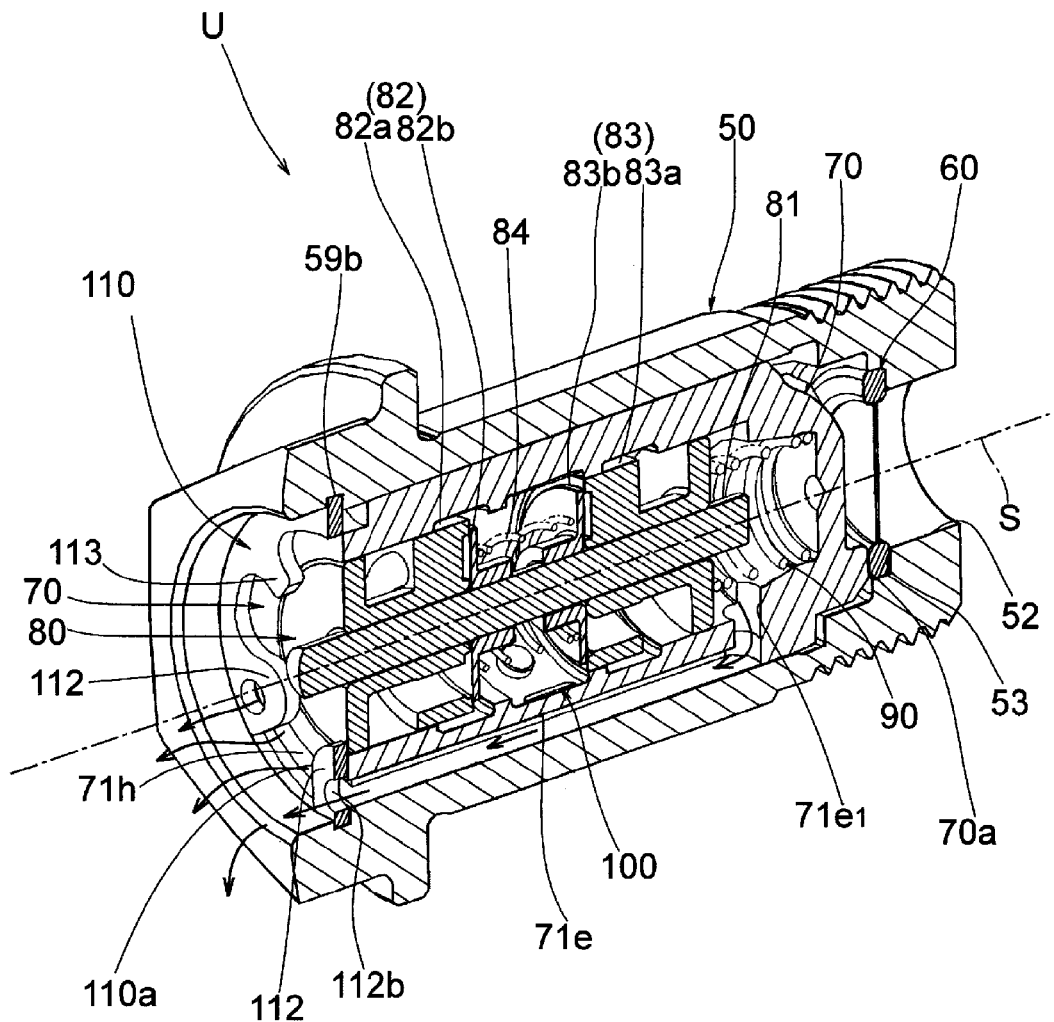
FIG. 14 shows the fluid control valve unit of the disclosure, and is a perspective cross-sectional view taken along a plane passing through a second discharge passage (second groove passage).
Figure 15:
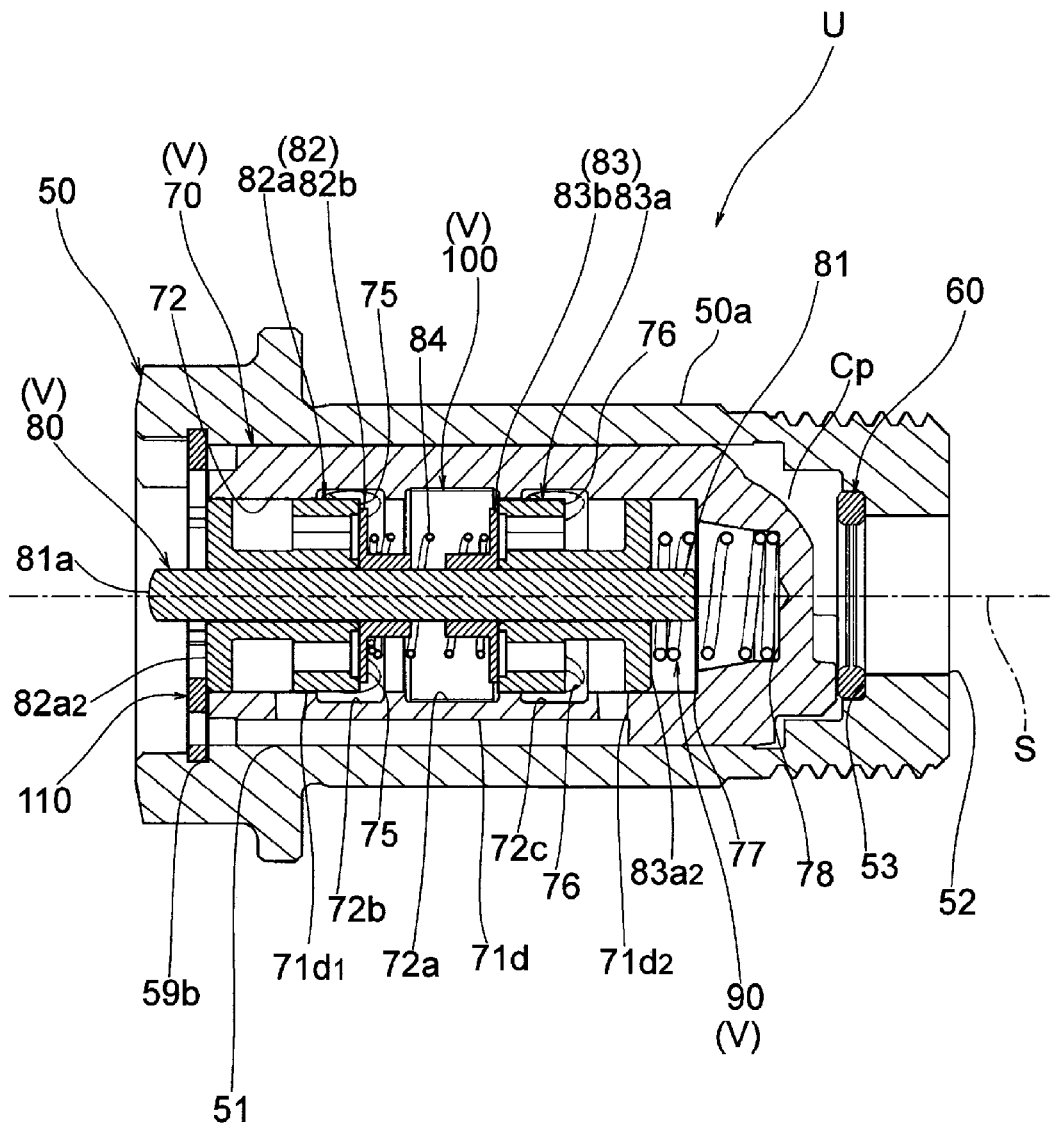
FIG. 15 shows the fluid control valve unit of the disclosure, and is a cross-sectional view in the region of the first discharge passage (first groove passage) that may communicate with the first communication port and the second communication port.
Figure 16:
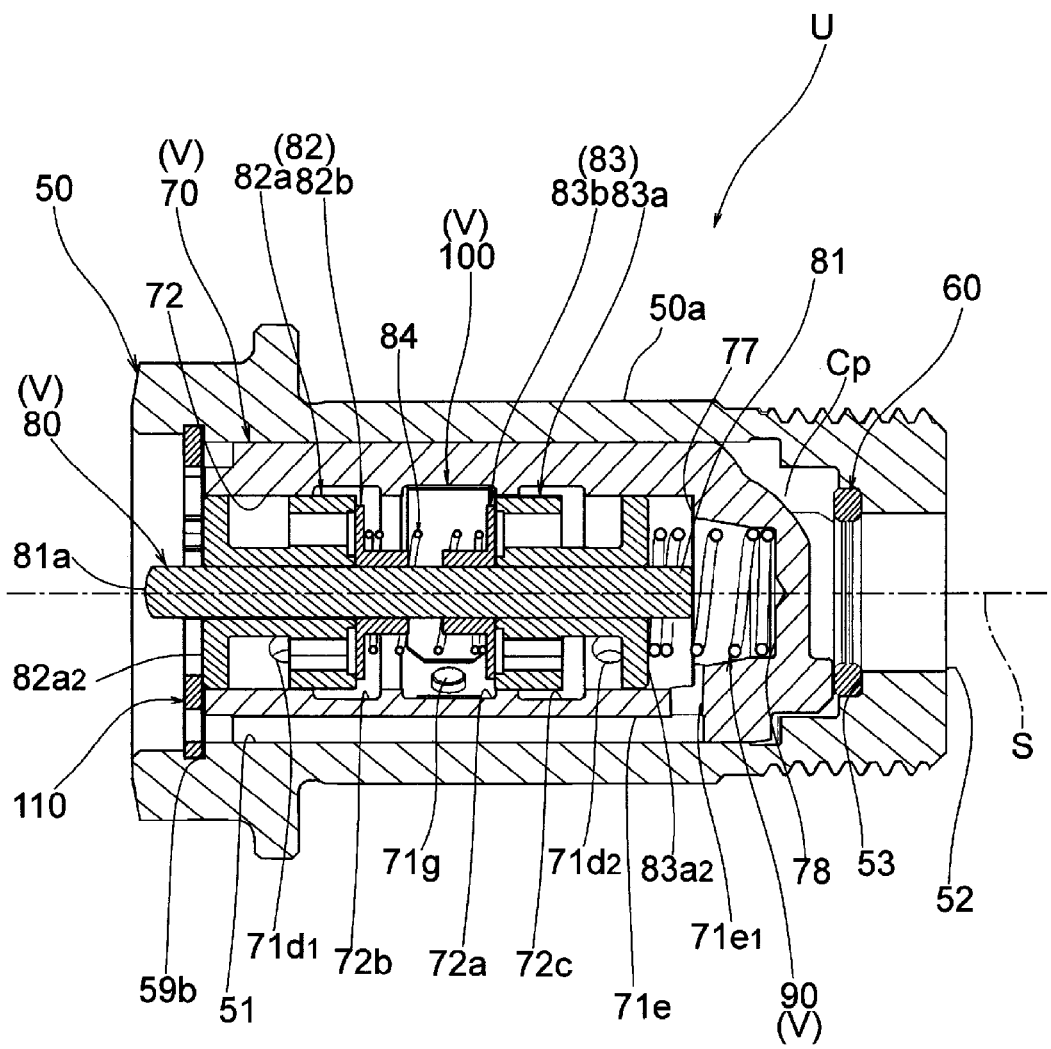
FIG. 16 shows the fluid control valve unit of the disclosure, and is a cross-sectional view in the region of the second discharge passage communicating with the region where the biasing spring that biases the spool is located.

The end 70a is received by the receiving part 53 of the fastening bolt 50 with the filter member 60 interposed therebetween in the direction of the axis S, as shown in FIGS. 10, 13 and 14.

The outer wall 71 is formed as a cylindrical surface centered on the axis S and closely fitted into the inner peripheral surface 51 of the fastening bolt 50.

The thinned part 71a is formed by hollowing out a part of the outer wall 71 in a region facing the supply port 74 (a first supply port 74a and a second supply port 74b) from the outside of the bottom wall and defines the crevice passage $C_p$ together with the inner wall of the fastening bolt 50.

The thinned part 71b is formed by hollowing out a part of the outer wall 71 in a region facing the retard passage 55 of the fastening bolt 50 from the retard port 75, and functions as a passage between the retard port 75 and the retard passage 55.

The thinned part 71c is formed by hollowing out a part of the outer wall 71 in a region facing the advance passage 56 of the fastening bolt 50 from the advance port 76, and functions as a passage between the advance port 76 and the advance passage 56.

The groove passage 71d is formed extending in the direction of the axis S in the outer wall 71 and functions as a first discharge passage which cooperates with the through passage $71d_1$ to communicate with the retard port 75 as the first communication port to discharge hydraulic oil when the first valve portion 82 is closed, and cooperates with the through passage $71d_2$ to communicate with the advance port 76 as the second communication port to discharge hydraulic oil when the second valve portion 83 is closed.

The groove passage 71e is formed extending in the direction of the axis S in the outer wall 71 at a position away from the groove passage 71d and functions as a second discharge passage which cooperates with the through passage $71e_1$ to discharge hydraulic oil that has accumulated in the region where the biasing spring 90 is disposed and which forms a breathing passage.

The fitting hole 71f is for fitting the fitting pin 71g, and is formed as a two-stage hole penetrating in the radial direction in the bottom wall of the annular groove 72a.

The fitting pin 71g is formed as a stepped pin in which two cylinders having different outer diameters are formed as a single piece using iron or steel material, and is closely fitted into the fitting hole 71f and protrudes radially inward from the bottom surface of the annular groove 72a so as not to interfere with the spool 80.

The communication recess 71h is formed in the outer wall 71 near the opening 73 so that the first groove passage 71d and the second groove passage 71e may communicate in the circumferential direction.

The inner peripheral surface 72 is formed in a cylindrical shape centered on the axis S, and brings the first valve portion 82 (first land $82a_1$) and the second valve portion 83 (second land $83a_1$) of the spool 80 into close contact and slidably guides them.

The annular groove 72a is formed as a cylindrical surface by hollowing out an annular shape to be recessed from the inner peripheral surface 72 with a width wider than the opening width of the supply port 74 in the direction of the axis S in the region facing the supply port 74 as an inlet, and the check valve 100 is disposed inside the annular groove 72a.

The annular groove 72b is formed by hollowing out an annular shape to be recessed from the inner peripheral surface 72 in a region facing the retard port 75 as the first communication port, and functions as a hydraulic oil passage.

The annular groove 72c is formed by hollowing out an annular shape to be recessed from the inner peripheral surface 72 in a region facing the advance port 76 as the second communication port, and functions as a hydraulic oil passage.

The opening 73 allows a rod 81 of the spool 80 to protrude in the direction of the axis S.

The supply port 74 functions as an inlet into which hydraulic oil as a fluid flows, communicates with the crevice passage $C_p$, and is disposed downstream of the through passage 54 in the crevice passage $C_p$.

Further, as shown in FIG. 10, the supply port 74 includes a first supply port 74a as a first inlet and a second supply port 74b as a second inlet, which are spaced apart from each other around the axis S.

The retard port 75 functions as a first communication port that communicates with the outside to allow the hydraulic oil as a fluid to pass through, communicates with the retard passage 55 of the fastening bolt 50 through the thinned part 71b, and also communicates with the retard chamber RC through the retard passage 28 of the vane rotor 20.

The advance port 76 functions as a second communication port that communicates with the outside to allow the hydraulic oil as a fluid to pass through, communicates with the advance passage 56 of the fastening bolt 50 through the thinned part 71c, and also communicates with the advance chamber AC through the advance passage 29 of the vane rotor 20.

Figure 17:
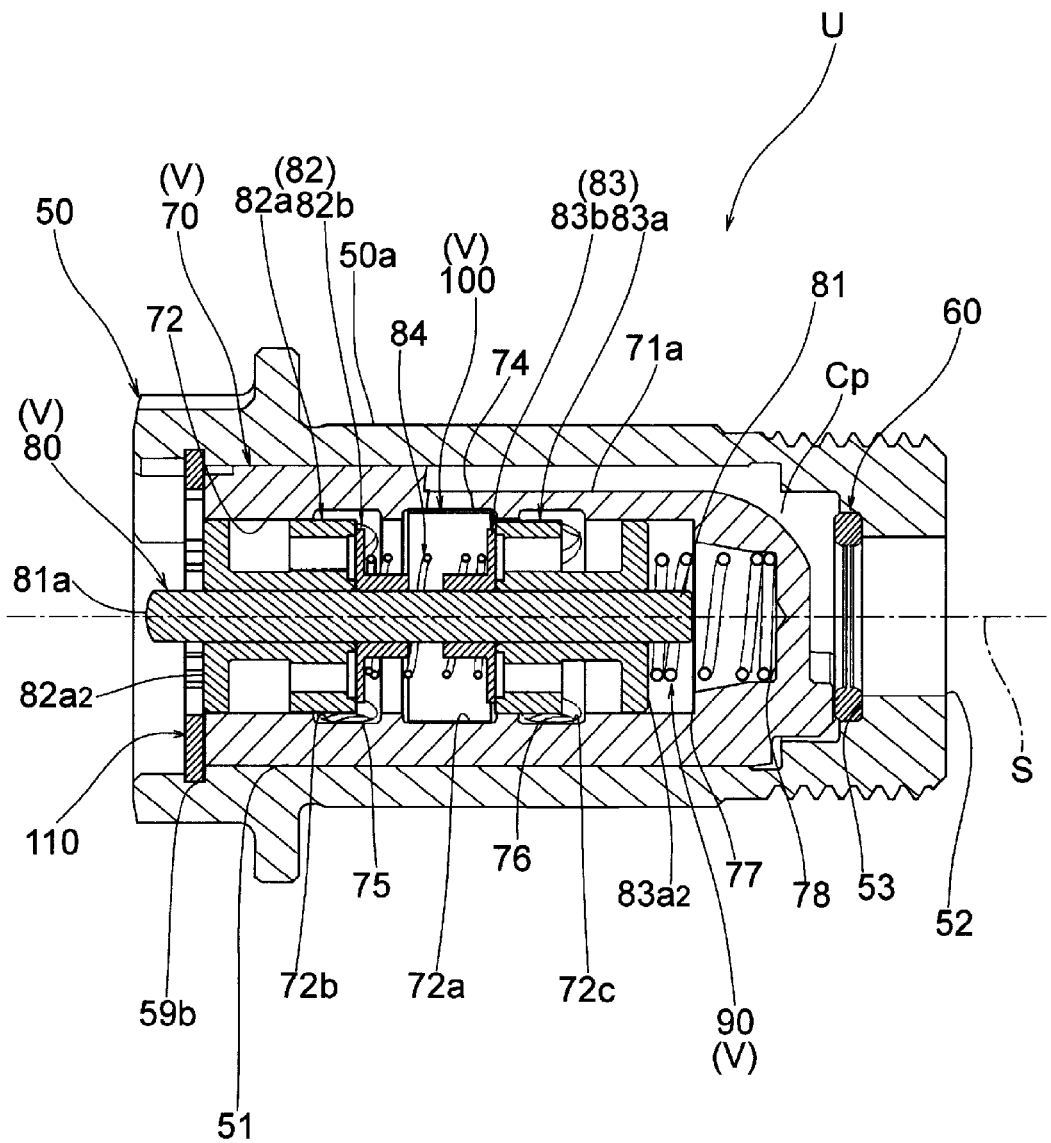
FIG. 17 shows the fluid control valve unit of the disclosure, and is a cross-sectional view in the region of the inlet (supply port).
Figure 18:
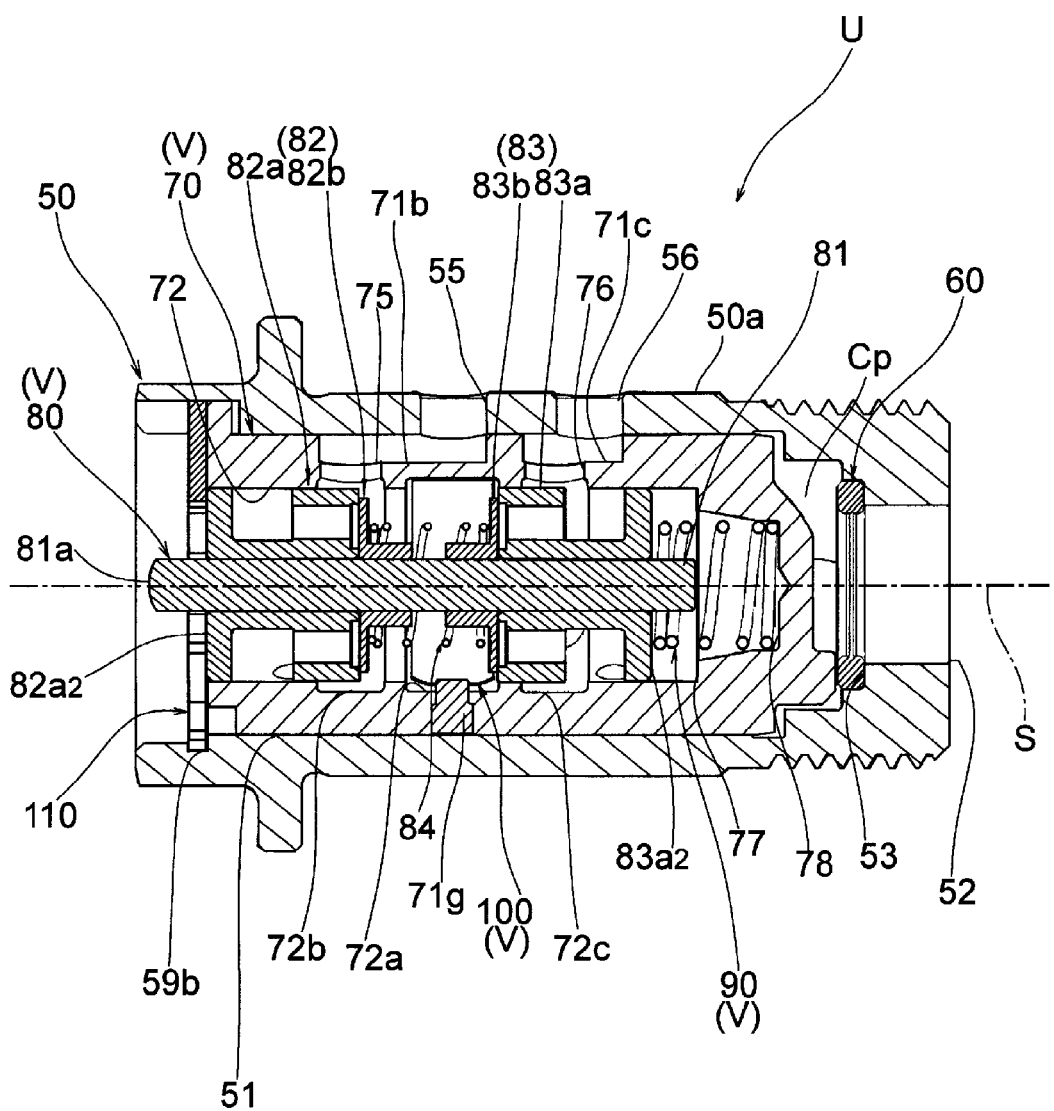
FIG. 18 shows the fluid control valve unit of the disclosure, and is a cross-sectional view in the region of the first communication port (retard port) and the second communication port (advance port).
Figure 19:
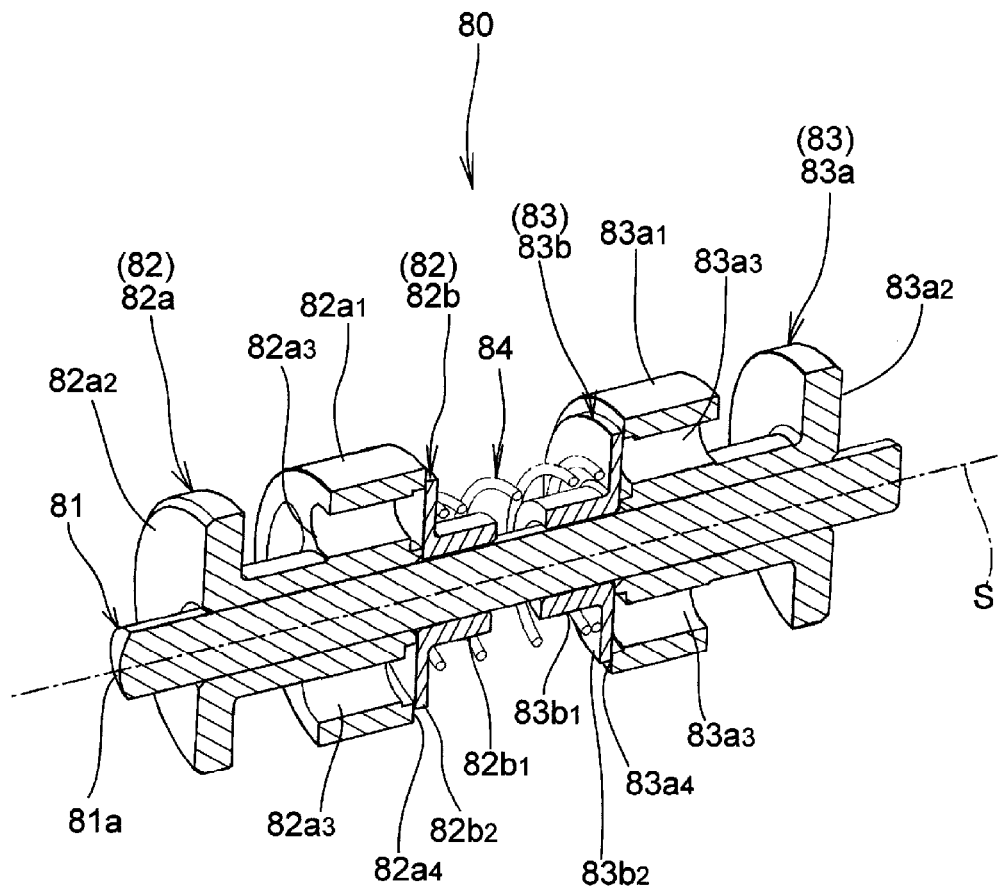
FIG. 19 is a perspective cross-sectional view showing the spool included in the fluid control valve unit of the disclosure.

Here, as shown in FIGS. 17 and 18, the retard port 75 and the advance port 76 are disposed on both sides of the supply port 74 in the direction of the axis S. That is, the communication ports communicating with the outside to allow the fluid to pass through include the first communication port (retard port 75) and the second communication port (advance port 75) located on both sides of the inlet (supply port 74) in the direction of the axis S.

The stopper wall 77 receives the end surface $83a_2$ of the second valve portion 83 of the spool 80 to stop the spool 80 at the deepest position corresponding to the advance mode.

The spring receiving part 78 receives the end of the biasing spring 90.

The positioning protrusion 79 is fitted into the positioning recess 59a of the fastening bolt 50 to position the sleeve 70 at a predetermined position around the axis S with respect to the fastening bolt 50 when the sleeve 70 is fitted onto the inner peripheral surface 51 of the fastening bolt 50.

As described above, the outer wall 71 of the sleeve 70 is formed with the discharge passages (the first groove passage 71d, the second groove passage 71e, and the communication recess 71h) through which the hydraulic oil to be discharged to the outside passes. Therefore, there is no need to provide a discharge passage in the fastening bolt 50 as a passage member, and thus the fluid control valve V including the sleeve 70 may be applied to various existing passage members.

As shown in FIGS. 13 to 19, the spool 80 is disposed inside the sleeve 70 to be slidable on the inner peripheral surface 72, and includes a rod 81 extending in the direction of the axis S, a first valve portion 82 and a second valve portion 83 provided on the rod 81, and a compression spring 84 disposed between the first valve portion 82 and the second valve portion 83.

The rod 81 is formed to extend in the direction of the axis S and includes an end 81a exposed to the outside. The drive shaft 7a of the electromagnetic actuator 7 is engaged with the end 81a, and a driving force is exerted against the biasing force of the biasing spring 90.

The first valve portion 82 opens and closes the passage between the supply port 74 and the retard port 75, and includes a first fixed part 82a fixed to the rod 81 and a first movable part 82b movably supported along the rod 81 and biased by the compression spring 84.

The first fixed part 82a includes a first land $82a_1$ that slides in close contact with the inner peripheral surface 72, an end surface $82a_2$, a first internal passage $82a_3$ and an end surface $82a_4$.

The first land $82a_1$ is formed to be a cylindrical surface centered on the axis S with an outer diameter that is substantially equal to or slightly smaller than the inner diameter of the inner peripheral surface 72 and is formed to have a width that closes the retard port 75, and the first land $82a_1$ opens or closes the retard port 75.

The first movable part 82b functions as a check valve in cooperation with the compression spring 84, and includes a first fitting part $82b_1$ slidably fitted to the rod 81 and a first lid part $82b_2$ detachably contacting the end surface $82a_4$ to open and close the first internal passage $82a_3$.

The second valve portion 83 opens and closes the passage between the supply port 74 and the advance port 76, and includes a second fixed part 83a fixed to the rod 81 and a second movable part 83b movably supported along the rod 81 and biased by the compression spring 84.

The second fixed part 83a includes a second land $83a_1$ that slides in close contact with the inner peripheral surface 72, an end surface $83a_2$, a second internal passage $83a_3$ and an end surface $83a_4$.

The second land $83a_1$ is formed to be a cylindrical surface centered on the axis S with an outer diameter that is substantially equal to or slightly smaller than the inner diameter of the inner peripheral surface 72 and is formed to have a width that closes the advance port 76, and the second land $83a_1$ opens or closes the advance port 76.

The second movable part 83b functions as a check valve in cooperation with the compression spring 84, and includes a second fitting part $83b_1$ slidably fitted to the rod 81 and a second lid part $83b_2$ detachably contacting the end surface $83a_4$ to open and close the second internal passage $83a_3$.

The compression spring 84 is a compression type coil spring, is disposed between the first movable part $82b$ of the first valve portion 82 and the second movable part $83b$ of the second valve portion 83, and exerts a biasing force so that the first lid part $82b_2$ closes the first internal passage $82a_3$, and the second lid part $83b_2$ closes the second internal passage $83a_3$.

Here, the relationship between the biasing force of the compression spring 84 and the passage resistance of the through passage $71d_1$ forming a part of the first discharge passage and the through passage $71d_2$ forming a part of the second discharge passage will be described.

When the first valve portion 82 is in the closed state and the pressure of the hydraulic oil flowing from the retard port 75 is large, the first lid part $82b_2$ opens, and the hydraulic oil discharged from the first discharge passage (through passage $71d_1$) is small, and the hydraulic oil actively flows into the advance port 76 side; when the pressure of the hydraulic oil flowing from the retard port 75 is small, the first lid part $82b_2$ is closed, and the hydraulic oil is actively discharged from the first discharge passage (through passage $71d_1$).

Further, when the second valve portion 83 is in the closed state and the pressure of the hydraulic oil flowing from the advance port 76 is large, the second lid part $83b_2$ opens, and the hydraulic oil discharged from the first discharge passage (through passage $71d_2$) is small, and the hydraulic oil actively flows into the retard port 75 side; when the pressure of the hydraulic oil flowing from the advance port 76 is small, the second lid part $83b_2$ is closed, and the hydraulic oil is actively discharged from the first discharge passage (through passage $71d_2$).

The biasing force of the compression spring 84 and the passage resistance of the through passages $71d_1$ and $71d_2$ are set to perform the above operation.

The biasing spring 90 is a compression type coil spring, and as shown in FIGS. 13 to 18, is assembled so that one end of the biasing spring 90 contacts the end surface $83a_2$ of the spool 80, and the other end of the biasing spring 90 contacts the spring receiving part 78 of the sleeve 70. When in the rest state, the biasing spring 90 exerts a biasing force to stop the spool 80 at a rest position where the end surface $82a_2$ of the spool 80 is brought into contact with protruding receiving parts 112 and 113 of the snap ring 110, that is, a position corresponding to the retard mode.

The check valve 100 is a C-shaped leaf spring formed by being bent in advance to bend a leaf spring made of spring steel in an annular shape with two ends facing each other to form a notch with a predetermined gap and to have an outer diameter larger than the inner diameter of the annular groove 72a.

The check valve 100 is disposed in the annular groove 72a of the sleeve 70 to be able to be contracted in diameter so that the fitting pin 71g is positioned in the gap of the notch, and the check valve 100 functions as a check valve that allows only the flow of the hydraulic oil supplied internally through the supply port 74 of the sleeve 70.

In the check valve 100, the opening characteristics are set so that hydraulic oil supplied flows through the passages 1b and 1c, the crevice passage $C_p$ and the supply port 74 into the fluid control valve V, and flows from the retard port 75 into the retard chamber RC or from the advance port 76 into the advance chamber AC, and then the lock is released when the hydraulic pressure of the hydraulic oil filled in the through passage 54 and the groove passage 27 reaches a hydraulic pressure capable of releasing the lock mechanism 40.

Figure 11:
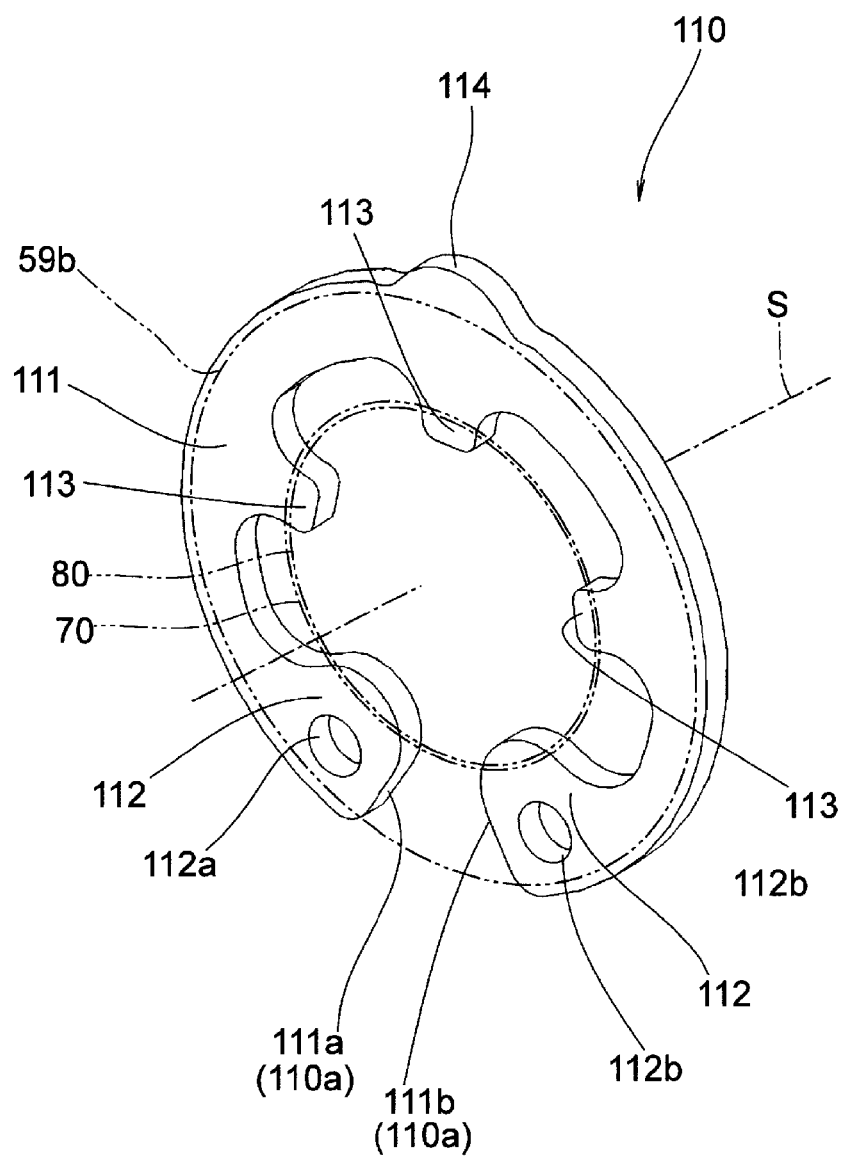
FIG. 11 is an external perspective view showing a snap ring included in the fluid control valve unit of the disclosure.
Figure 12:
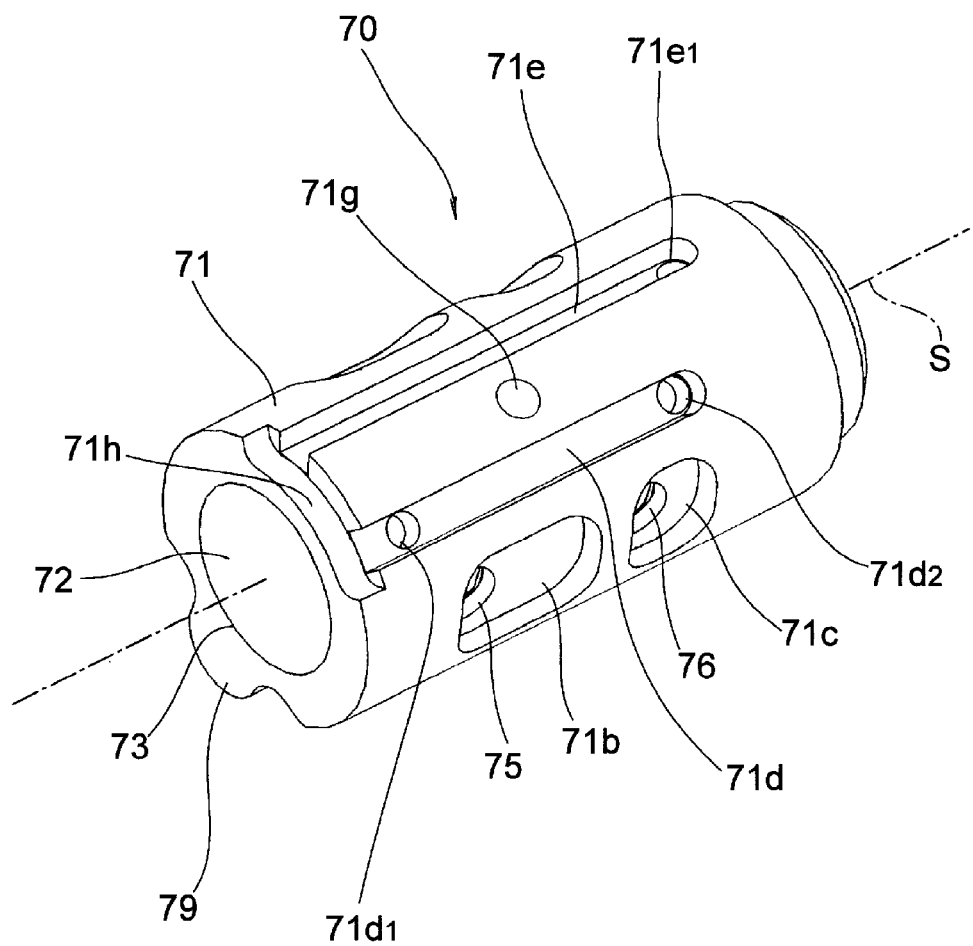
FIG. 12 is an external perspective view showing a sleeve included in the fluid control valve unit of the disclosure.

The snap ring 110 is fitted into the annular groove 59b of the fastening bolt 50, and is made of spring steel or the like. As shown in FIG. 11, the snap ring 110 is formed to have a flat plate shape extending in a direction perpendicular to the axis S and to have a substantially C shape having a notch 110a with a predetermined gap.

The snap ring 110 includes an annular receiving part 111, multiple (here, five) protruding receiving parts 112 and 113 protruding radially inwardly from the annular receiving part 111 at substantially equal intervals around the axis S, and a fitting protrusion 114.

The annular receiving part 111 receives the end surface of the sleeve 70 inserted into the inner peripheral surface 51 of the fastening bolt 50 on the opening 73 side.

The two protruding receiving parts 112 and the three protruding receiving parts 113 respectively receive the end surface of the sleeve 70 in the base side region and detachably receive the end surface 82a of the spool 80 in the tip side region.

The two protruding receiving parts 112 are provided near two ends 111a and 111b that define the notch 110a, and are formed with two holes, that is, a circular hole 112a on one side and a circular hole 112b on the other side.

The two circular holes 112a and 112b are for inserting the tip of a tool (for example, a snap ring plier) used when attaching the snap ring 110 to the annular groove 59b.

In the snap ring 110 configured as described above, the notch 110a and the two circular holes 112a and 112b function as openings through which hydraulic oil passes.

The fitting protrusion 114 is formed to fit into the positioning recess 59a of the fastening bolt 50 at an angular position about the axis S so that the opening (the notch 110a and the two circular holes 112a and 112b) corresponds to the discharge passage (the first groove passage 71d, the second groove passage 71e, and the communication recess 71h).

That is, as shown in FIGS. 10, 13 and 14, after the fluid control valve V (the sleeve 70, the spool 80, the biasing spring 90, and the check valve 100) and the filter member 60 are fitted into the fastening bolt 50, the snap ring 110, by being fitted into the annular groove 59b, is capable of restricting the fluid control valve V accommodated in the fastening bolt 50 from falling off in the direction of the axis S and is capable of discharging hydraulic oil flowing through the discharge passage (the first groove passage 71d, the second groove passage 71e, and the communication recess 71h) formed in the fastening bolt 50.

In this way, when the fluid control valve unit U is applied to the valve timing changing device M to change the valve timing, it is possible to smoothly discharge excess hydraulic oil without stopping and to achieve a desired changing operation.

According to the fluid control valve unit U configured as described above, the fastening bolt 50 as the passage member includes the receiving part 53 that receives the end 70a of the sleeve 70 in the direction of the axis S and the annular groove 59b recessed from the inner peripheral surface 51, and the snap ring 110 is fitted in the annular groove part 59b to be capable of restricting the fluid control valve V accommodated in the fastening bolt 50 from falling off in the direction of the axis S and capable of discharging hydraulic oil flowing through the discharge passage (the first groove passage 71d as the first discharge passage and the second groove passage 71e as second discharge passage) formed in the fastening bolt 50; therefore, the structure may be simplified, the number of parts may be reduced, and the functional reliability may be improved.

Further, the fastening bolt 50 includes the positioning recess 59a for positioning the sleeve 70 around the axis S, and the sleeve 70 includes the discharge passage (the first groove passage 71d as the first discharge passage and the second groove passage 71e as the second discharge passage) and the positioning protrusion 79 fitted in the positioning recess 59a, and the snap ring 110 includes the opening (the notch 110a and two circular holes 112a and 112b) through which hydraulic oil passes and the fitting protrusion 114 that is fitted into the positioning recess 59a so that the opening (110a, 112a, 112b) corresponds to the discharge passage (71d, 71e, 71h); therefore, the opening (110a, 112a, 112b) may be easily positioned to correspond to the discharge passage (71d, 71e, 71h) simply by fitting the fitting protrusion 114 into the positioning recess 59a.

Further, the sleeve 70 includes the discharge passages (the first groove passage 71d, the second groove passage 71e, and the communication recess 71h) through which the hydraulic oil to be discharged to the outside passes in the outer wall 71. Therefore, there is no need to provide a discharge passage in the fastening bolt 50 as a passage member, and thus the fluid control valve V including the sleeve 70 may be applied to various existing passage members.

In addition, the sleeve 70 includes the communication recess 71h in the outer wall 71 that causes the first groove passage 71d and the second groove passage 71e to communicate with each other in the circumferential direction to define the discharge passage; therefore, the hydraulic oil may be easily guided toward the opening of the snap ring 110 (notch 110a).

Further, the filter member 60 is sandwiched between the end 70a of the sleeve 70 and the receiving part 53 of the fastening bolt 50; therefore, compared with the conventional case of fitting and fixing to the inner peripheral surface of the passage member, the attachment is easier and the functional reliability is improved.

In addition, the snap ring 110 is formed in a flat plate shape extending in a direction perpendicular to the axis S; therefore, it may be made thinner in the direction of the axis S compared with bottomed cylinders, which contributes to miniaturization of the fluid control valve unit U.

Further, the snap ring 110 is inserted into the annular groove 59b while contracting in diameter using a tool, and then expanded in diameter simply by removing the tool, so that it comes into close contact with the bottom surface of the annular groove 59b and its movement in the direction of the axis S is restrained; therefore, the mounting work is simple, and even if the snap ring 110 receives impact due to the reciprocating movement of the spool 80, it does not come off from the annular groove 59b.

Therefore, compared with a conventional engagement member that is fitted and fixed on the inner peripheral surface, the structure may be simplified and functional reliability may be improved, and the fluid control valve V may operate smoothly, and the desired function may be ensured.

Although five protruding receiving parts 112 and 113 are shown here, a configuration including at least one protruding receiving part, preferably three protruding receiving parts disposed at equal intervals, may be adopted.

Next, the operation of the valve timing changing device M will be described.

When the internal combustion engine is stopped, the vane rotor 20 is locked at an intermediate position with respect to the housing rotor 10 by the lock mechanism 40, as shown in FIG. 20.

In this way, the internal combustion engine may be started smoothly while preventing the flapping of the vane rotor 20 and the like. In addition, when the internal combustion engine is stopped, hydraulic oil is basically filled in the retard chamber RC by opening the first valve portion 82 at the rest position (a state in which communication between the first groove passage 71d and the through passage $71d_1$ and the retard port 75 is blocked) and by the backflow prevention function of the check valve 100, except for the amount that leaks from the gaps.

Subsequently, when the internal combustion engine is started, the hydraulic oil supplied through the passages 1b and 1c and the crevice passage $C_p$ opens the check valve 100, flows into the fluid control valve V from the supply port 74, and is supplied to the retard chamber RC from the retard port 75 or the advance chamber AC from the advance port 76, and then when the hydraulic pressure of the hydraulic oil guided to the lock mechanism 40 through the through passage 54 and the groove passage 27 reaches a releasing hydraulic pressure, the lock pin 41 is released from the lock hole 11d to release the lock. After the internal combustion engine is started, the position of the spool 80 of the fluid control valve V is appropriately controlled via the drive shaft 7a of the electromagnetic actuator 7, and phase control is performed so that the vane rotor 20 and the camshaft 1 are retarded, advanced, or held at a predetermined angular position.

First, the operation when the internal combustion engine is operating at low speed, for example, will be described. In this low-speed operation state, the hydraulic oil in the retard chamber RC and the advance chamber AC may reciprocate following torque fluctuations ($\Delta T$, $-\Delta T$) exerted by the camshaft 1.

Figure 23:
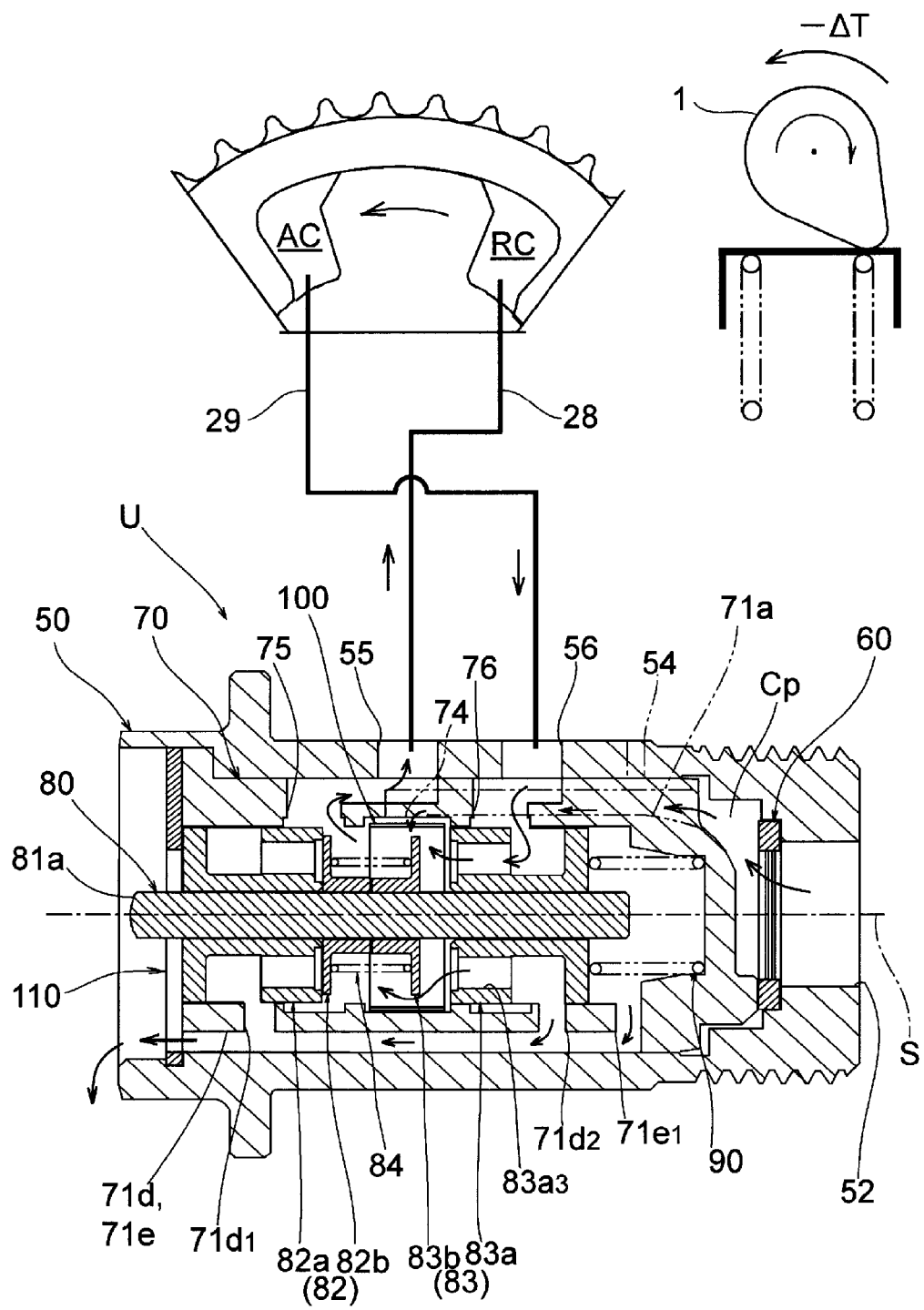
FIG. 23 is a schematic view showing the relationship between the spool of the fluid control valve and the flow of hydraulic oil in the retard port, the advance port, the retard chamber, and the advance chamber when the camshaft receives a reverse torque in the retard mode.
Figure 24:
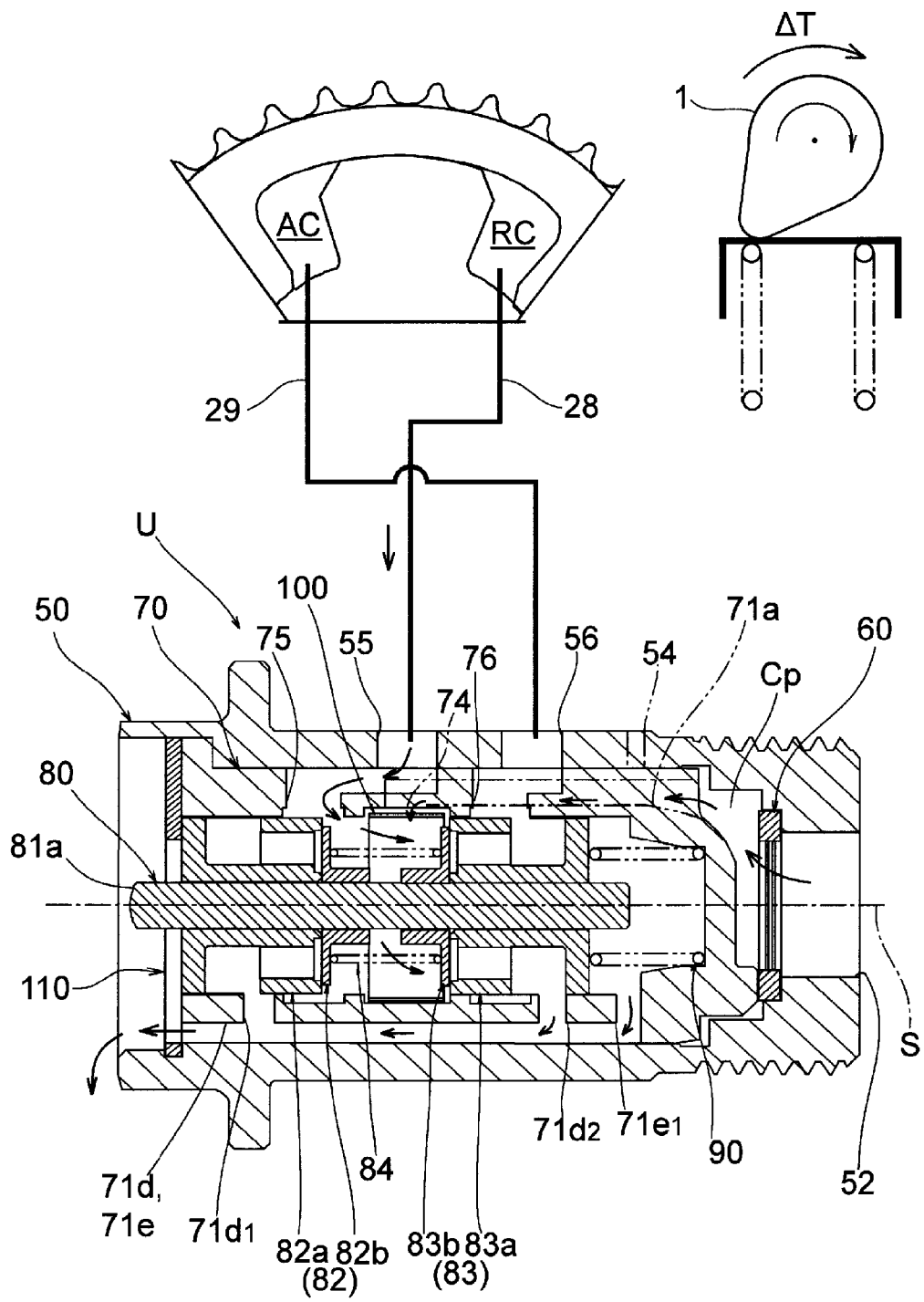
FIG. 24 is a schematic view showing the relationship between the spool of the fluid control valve and the flow of hydraulic oil in the retard port, the advance port, the retard chamber, and the advance chamber when the camshaft receives a forward torque in the retard mode.

For example, in the retard mode, the spool 80 is positioned at the rest position by the biasing force of the biasing spring 90, as shown in FIGS. 23 and 24.

In the retard mode, the first valve portion 82 is set to an open state in which the passage between the supply port 74 and the retard port 75 is opened, and the second valve portion 83 is in a closed state in which the passage between the supply port 74 and the advance port 76 is closed; specifically, a state is set in which the second land $83a_1$ of the second fixed part 83a opens the advance port 76, and the second lid part $83b_2$ of the second movable part 83b closes the second internal passage $83a_3$. Further, the first discharge passage (the first groove passage 71d and the through passage $71d_2$) communicates with the advance port 76 and is in a state in which the hydraulic oil in the advance chamber AC may be discharged.

In this state, when the camshaft 1 receives a reverse torque ($-\Delta T$) in a direction opposite to the forward rotation direction CR, the oil pressure of the hydraulic oil in the advance chamber AC increases. Therefore, as shown in FIG. 23, the hydraulic oil in the advance chamber AC resists the biasing force of the compression spring 84 and separates the second lid part $83b_2$ of the second movable part 83b from the second fixed part 83a. In this way, the second internal passage $83a_3$ is opened, and hydraulic oil actively flows from the advance port 76 to the retard port 75. At this time, a smaller amount of hydraulic oil than the hydraulic oil flowing to the retard port 75 passes through the first discharge passage (the through passage $71d_2$ and the first groove passage 71d, and the communication recess 71h) and is discharged from the opening of the snap ring 110 (the notch 110a and the circular hole 112a). In addition, the hydraulic oil that has leaked into the region where the biasing spring 90 is disposed passes through the second discharge passage (the through passage $71e_1$ and the second groove passage 71e, and the communication recess 71h) as appropriate, and is discharged from the opening of the snap ring 110 (the notch 110a and the circular hole 112b)).

In addition, when the camshaft 1 receives a forward torque (ΔT), the oil pressure of the hydraulic oil in the retard chamber RC increases. However, as shown in FIG. 24, since the hydraulic oil in the retard chamber RC acts in a direction to bring the second movable part 83b into contact with the second fixed part 83a, the second internal passage $83a_3$ is closed, and hydraulic oil does not flow from the retard port 75 to the advance port 76.

By continuously receiving the reverse torque (−ΔT) and the forward torque (ΔT), the hydraulic oil in the advance chamber AC moves into the retard chamber RC, and the vane rotor 20 is positioned at the most retarded position shown in FIG. 21. During this process, the check valve 100 is appropriately opened to allow the inflow of hydraulic oil from the supply port 74 in order to replenish the hydraulic oil.

Figure 25:
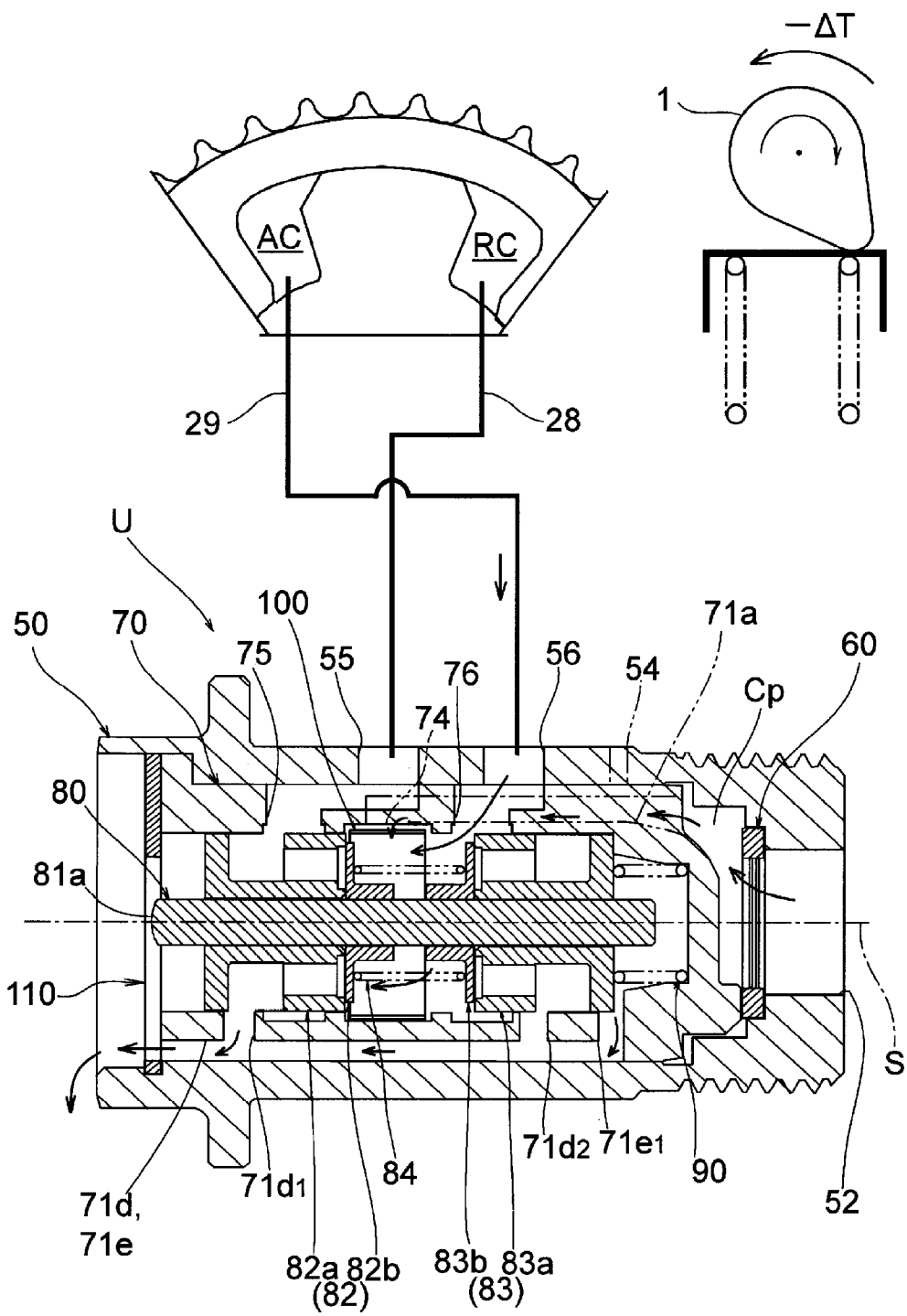
FIG. 25 is a schematic view showing the relationship between the spool of the fluid control valve and the flow of hydraulic oil in the retard port, the advance port, the retard chamber, and the advance chamber when the camshaft receives a reverse torque in the advance mode.
Figure 26:
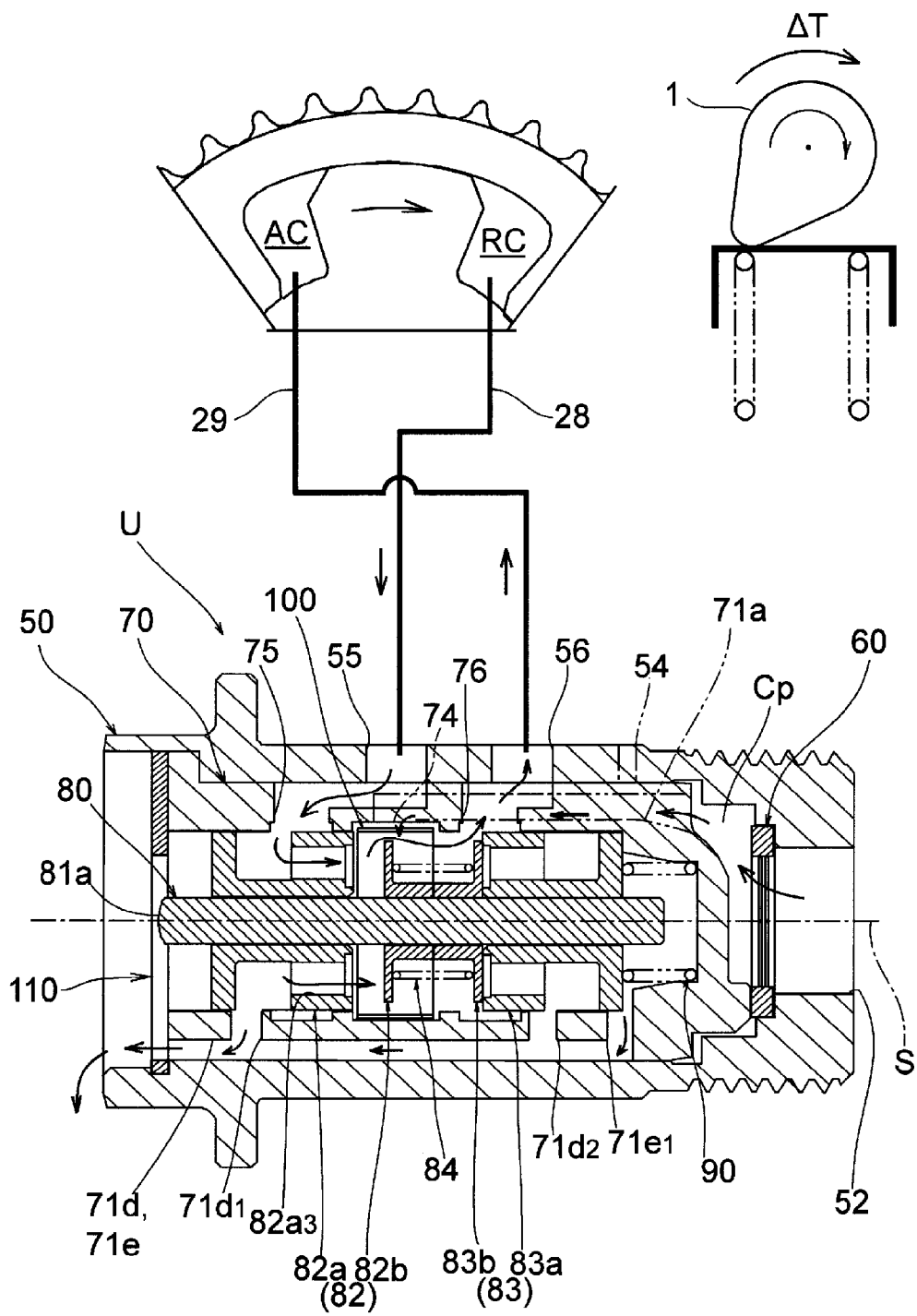
FIG. 26 is a schematic view showing the relationship between the spool of the fluid control valve and the flow of hydraulic oil in the retard port, the advance port, the retard chamber, and the advance chamber when the camshaft receives a forward torque in the advance mode.

Next, in the advance mode, as shown in FIGS. 25 and 26, the spool 80 is positioned at the deepest position in the direction of the axis S by the drive shaft 7a of the electromagnetic actuator 7 against the biasing force of the biasing spring 90.

In the advance mode, the second valve portion 83 is set to an open state in which the passage between the supply port 74 and the advance port 76 is opened, and the first valve portion 82 is in a closed state in which the passage between the supply port 74 and the retard port 75 is closed; specifically, a state is set in which the first land $82a_1$ of the first fixed part 82a opens the retard port 75, and the first lid part $82b_2$ of the first movable part 82b closes the first internal passage $82a_3$. Further, the first discharge passage (the groove passage 71d and the through passage $71d_1$) communicates with the retard port 75 and is in a state in which the hydraulic oil in the retard chamber RC may be discharged.

In this state, when the camshaft 1 receives a reverse torque (−ΔT) in a direction opposite to the forward rotation direction CR, the oil pressure of the hydraulic oil in the advance chamber AC increases. However, as shown in FIG. 25, since the hydraulic oil in the advance chamber AC acts in a direction to bring the first movable part 82b into contact with the first fixed part 82a, the first internal passage $82a_3$ is closed, and hydraulic oil does not flow from the advance port 76 to the retard port 75.

In addition, when the camshaft 1 receives a forward torque (ΔT), the oil pressure of the hydraulic oil in the retard chamber RC increases. Therefore, as shown in FIG. 26, the hydraulic oil in the retard chamber RC resists the biasing force of the compression spring 84 and separates the first lid part $82b_2$ of the first movable part 82b from the first fixed part 82a. In this way, the first internal passage $82a_3$ is opened, and hydraulic oil actively flows from the retard port 75 to the advance port 76. At this time, a smaller amount of hydraulic oil than the hydraulic oil flowing to the advance port 76 passes through the first discharge passage (the through passage $71d_1$ and the first groove passage 71d, and the communication recess 71h) and is discharged from the opening of the snap ring 110 (the notch 110a and the circular hole 112a). In addition, the hydraulic oil that has leaked into the region where the biasing spring 90 is disposed passes through the second discharge passage (the through passage $71e_1$ and the second groove passage 71e, and the communication recess 71h) as appropriate, and is discharged from the opening of the snap ring 110 (the notch 110a and the circular hole 112b).

By continuously receiving the reverse torque (−ΔT) and the forward torque (ΔT), the hydraulic oil in the retard chamber RC moves into the advance chamber AC, and the vane rotor 20 is positioned at the most advanced position shown in FIG. 22. During this process, the check valve 100 is appropriately opened to allow the inflow of hydraulic oil from the supply port 74 in order to replenish the hydraulic oil.

That is, in the state where the spool 80 of the fluid control valve V is positioned in the retard mode in which the first valve portion 82 is opened and the second valve portion 83 is closed, when the camshaft 1 receives a reverse torque (−ΔT), the second valve portion 83 opens to allow hydraulic oil to flow from the advance port 76 to the retard port 75; in the state where the spool 80 is positioned in the advance mode in which the first valve portion 82 is closed and the second valve portion 83 is opened, when the camshaft 1 receives a forward torque (ΔT), the first valve portion 82 opens to allow hydraulic oil to flow from the retard port 75 to the advance port 76.

The above series of operations are operations when the internal combustion engine is in a low-speed operation state, for example; when the internal combustion engine is operating at high speed, for example, the torque fluctuation (ΔT, −ΔT) exerted by the camshaft 1 is small, and reciprocating movement of hydraulic oil in the retard chamber RC and the advance chamber AC does not occur, and the opening and closing operations of the first valve portion 82 and the second valve portion 83 due to torque fluctuations are difficult to perform.

As a result, the valve opening of the check valve 100 causes the hydraulic oil supplied from the supply port 74 to actively flow into the retard chamber RC or the advance chamber AC, and hydraulic oil in the advance chamber AC or the retard chamber RC passes through the first discharge passage (the through passage $71d_2$ or the through passage $71d_1$ and first groove passage 71d) and is actively discharged to the outside from the opening of the snap ring 110 (the notch 110a and the circular hole 112a). In addition, the hydraulic oil that has leaked into the region where the biasing spring 90 is disposed passes through the second discharge passage (the through passage $71e_1$ and the second groove passage 71e, and the communication recess 71h) as appropriate, and is discharged from the opening of the snap ring 110 (the notch 110a and the circular hole 112b).

Figure 27:
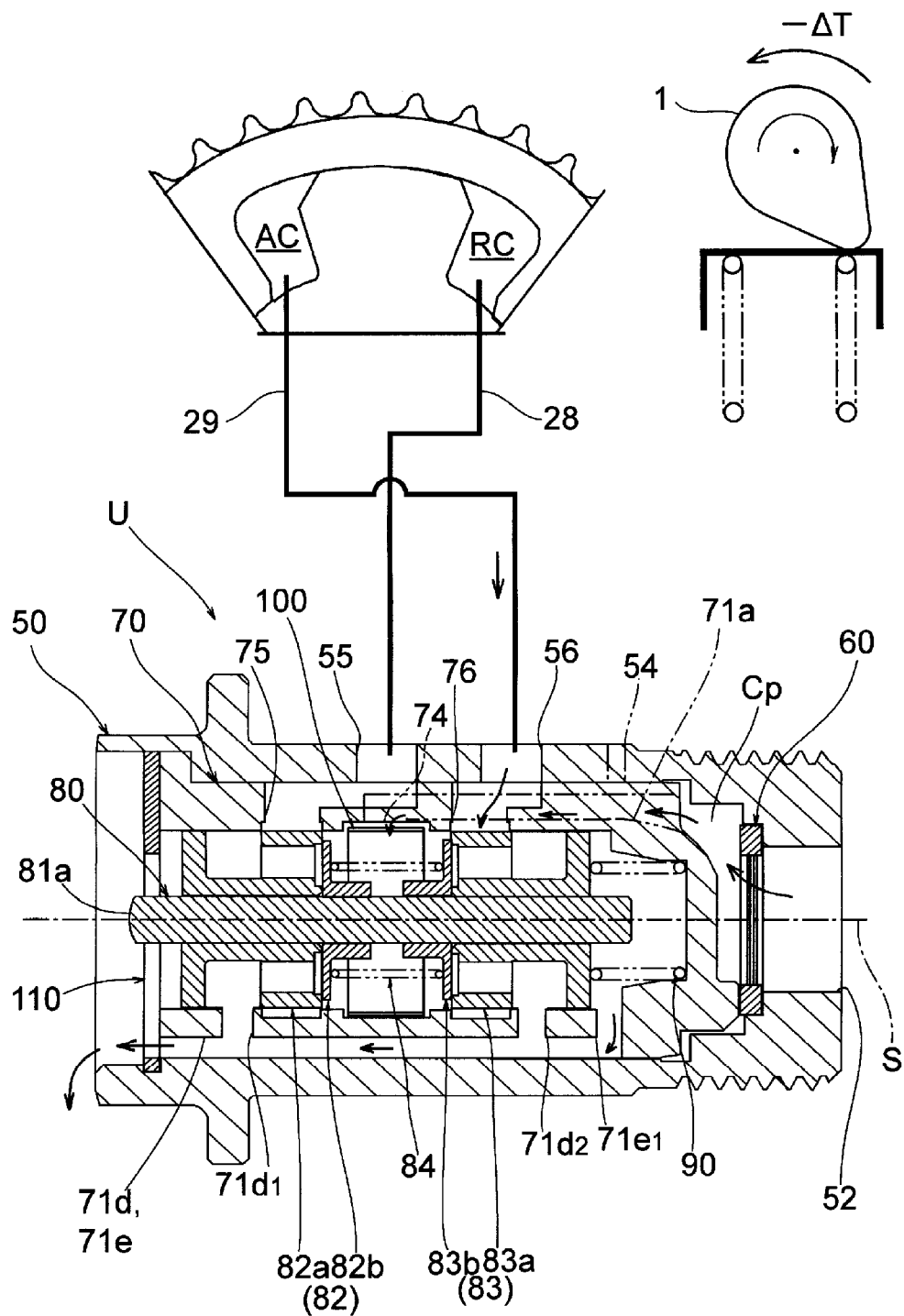
FIG. 27 is a schematic view showing the relationship between the spool of the fluid control valve and the flow of hydraulic oil in the retard port, the advance port, the retard chamber, and the advance chamber when the camshaft receives a reverse torque in the neutral holding mode.
Figure 28:
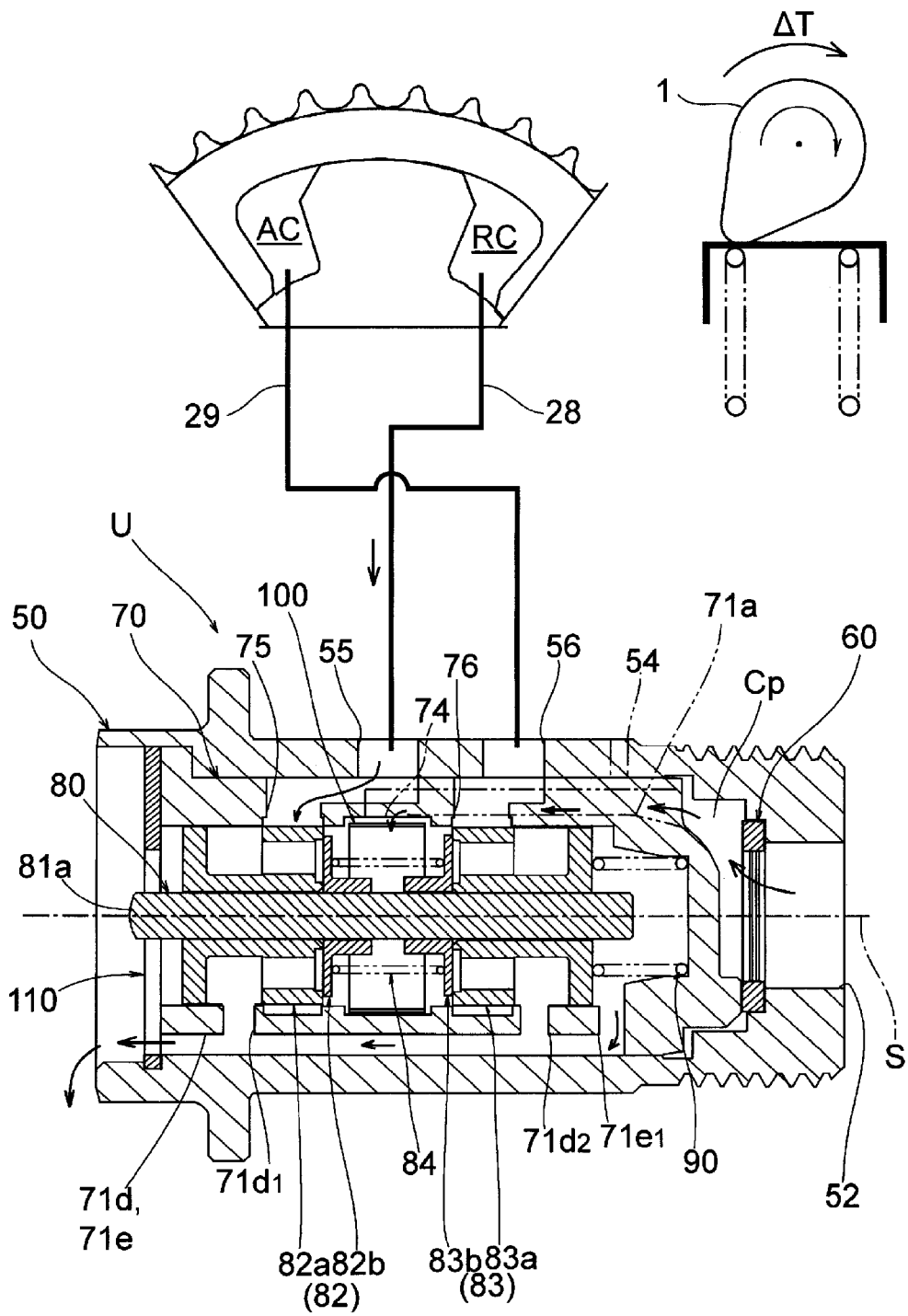
FIG. 28 is a schematic view showing the relationship between the spool of the fluid control valve and the flow of hydraulic oil in the retard port, the advance port, the retard chamber, and the advance chamber when the camshaft receives a forward torque in the neutral holding mode.

Next, in the neutral holding mode, as shown in FIGS. 27 and 28, the spool 80 is positioned at the intermediate position in the direction of the axis S by the drive shaft 7a of the electromagnetic actuator 7 against the biasing force of the biasing spring 90.

In the neutral holding mode, the first valve portion 82 is set to a closed state in which the passage between the supply port 74 and the retard port 75 is closed, and the second valve portion 83 is set to a closed state in which the passage between the supply port 74 and the advance port 76 is closed.

Specifically, the first valve portion 82 is set to a state in which the first land $82a_1$ of the first fixed part 82a closes the retard port 75, and the first lid part $81b_2$ of the first movable part 82b closes the first internal passage $82a_3$. Further, the second valve portion 83 is set to a state in which the second land $83a_1$ of the second fixed part 83a closes the advance port 76, and the second lid part $83b_2$ of the second movable part 83b closes the second internal passage $83a_3$. Further, communication between the first discharge passage (the groove passage 71d and the through passage $71d_1$) and the retard port 75 is blocked, and communication between the second discharge passage (the groove passage 71d and the through passage 71d₂) and the advance port 76 is blocked.

In this state, when the camshaft 1 receives a reverse torque (−ΔT) in a direction opposite to the forward rotation direction CR, the oil pressure of the hydraulic oil in the advance chamber AC increases. However, since the advance port 76 is closed by the second land 83a₁ of the second valve portion 83 as shown in FIG. 27, the hydraulic oil in the advance chamber AC cannot move from the advance port 76 to the retard port 75 and stays in the advance chamber AC.

In addition, when the camshaft 1 receives a forward torque (ΔT), the oil pressure of the hydraulic oil in the retard chamber RC increases. However, since the retard port 75 is closed by the first land 82a₁ of the first valve portion 82 as shown in FIG. 28, the hydraulic oil in the retard chamber RC cannot move from the retard port 75 to the advance port 76 and stays in the retard chamber RC.

As described above, in the neutral holding mode, the reciprocation of hydraulic oil between the retard chamber RC and the advance chamber AC is blocked, and the first discharge passage (the through passages 71d₁ and 71d₂) are also closed; therefore, the vane rotor 20 is held at a desired intermediate position with respect to the housing rotor 10 between the most retarded position and the most advanced position.

That is, in the fluid control valve V, the spool 80 is formed to block the reciprocation of hydraulic oil between the retard chamber RC and the advance chamber AC in the state of being positioned in the neutral holding mode in which the first valve portion 82 closes the retard port 75 and the second valve portion 83 closes the advance port 76.

As described above, the fluid control valve V is a torque-driven and hydraulically-driven fluid control valve capable of reciprocating hydraulic oil between the retard chamber RC and the advance chamber AC by the fluctuating torque received by the camshaft 1 and capable of discharging a part of the supplied hydraulic oil; therefore, the hydraulic oil may be caused to reciprocate between the retard chamber RC and the advance chamber AC in an operating state where a sufficient fluctuating torque is obtained (for example, during low-speed operation), and the hydraulic oil may be discharged actively to change the opening/closing timing of the valve to the desired timing in an operating state where it is difficult to obtain a sufficient fluctuating torque (for example, during high-speed operation).

As described above, according to the fluid control valve unit U according to the above embodiment, the simplification of the structure, the reduction in the number of parts, and the improvement in functional reliability may be achieved, and smooth operation may be ensured, and desired functions may be achieved. Further, according to the valve timing changing device M including the fluid control valve unit U, it is possible to achieve a desired operation without incurring a malfunction of the fluid control valve V while achieving miniaturization of the device, smoothly discharging excess hydraulic oil, and the like.

In the above embodiment, the snap ring 110 having five protruding receiving parts 112 and 113 is shown as the snap ring, but the disclosure is not limited thereto, and a snap ring having one, three, or other number of protruding receiving parts may be adopted.

In the above embodiment, the snap ring 110 has a flat plate shape extending in a direction perpendicular to the axis S, but the disclosure is not limited thereto, and a snap ring having another form may be adopted as long as it is fitted in the annular groove of the passage member to be capable of restricting the fluid control valve V accommodated in the passage member from falling off in the direction of the axis S and to be capable of discharging fluid flowing through a discharge passage formed in the passage member.

In the above embodiment, the lock mechanism 40 locks in the intermediate position, but the disclosure is not limited thereto, and the lock mechanism 40 may be in the most retarded position or any position.

In the above embodiment, the rotation biasing spring 30 exerting a biasing force in the advancing direction is shown as the rotation biasing spring for rotationally biasing the vane rotor 20, but the disclosure is not limited thereto, and a rotation biasing spring that exerts a biasing force in the retarding direction may be adopted instead.

In the above embodiment, the fluid control valve V that is torque-driven and hydraulically-driven is shown as the fluid control valve, but the disclosure is not limited thereto. Other forms of fluid control valves may be adopted as long as they may supply and discharge hydraulic oil.

In the above embodiment, the fluid control valve unit U in which the fluid control valve V is disposed inside the fastening bolt 50 as the passage member is shown as the fluid control valve unit, but the disclosure is not limited thereto, and the disclosure may also be applied to a configuration in which the fluid control valve V is disposed in another passage member or in the cylinder block of the engine.

In the above embodiment, hydraulic oil is shown as the fluid controlled by the fluid control valve unit, but the disclosure is not limited thereto, and the fluid control valve unit may be applied in controlling the flow of other fluids.

As described above, the fluid control valve unit of the disclosure may simplify the structure, reduce the number of parts, improve functional reliability, ensure smooth operation, and achieve desired functions. Therefore, it may be applied not only to internal combustion engines mounted on automobiles and the like, but also to internal combustion engines mounted on motorcycles and the like, and other machines or devices for controlling the flow of fluid.

What is claimed is:

1. A fluid control valve unit comprising:
   a fluid control valve comprising a sleeve in a bottomed cylindrical shape defining a predetermined axis, and a spool slidably accommodated in the sleeve in a direction of the axis;
   a cylindrical passage member comprising an inner peripheral surface to which the sleeve is fitted, a receiving part annularly formed inside the cylindrical passage member and configured for receiving an end of the sleeve in the direction of the axis, and an annular groove recessed from the inner peripheral surface; and
   a snap ring comprising a notch with a predetermined gap and fitted in the annular groove to be capable of restricting the fluid control valve accommodated in the passage member from falling off in the direction of the axis and to be capable of discharging fluid flowing through a discharge passage formed in the passage member,
   wherein the passage member comprises a positioning recess for positioning the sleeve around the axis,
   the sleeve comprises the discharge passage for discharging fluid and a positioning protrusion that is fitted into the positioning recess,
   the snap ring comprises an opening through which fluid passes and a fitting protrusion that is fitted into the positioning recess so that the opening communicates with the discharge passage, and wherein the sleeve comprises a first groove passage and a second groove passage formed extending in the direction of the axis in an outer wall to define the discharge passage, and a communication recess in the outer wall that causes the first groove passage and the second groove passage to communicate with each other in a circumferential direction to define the discharge passage.

2. The fluid control valve unit according to claim 1, wherein the snap ring comprises:
an annular receiving part that receives the sleeve; and
a protruding receiving part that protrudes radially inward from the annular receiving part and detachably receives the spool.

3. The fluid control valve unit according to claim 1, wherein the snap ring comprises two holes near two ends defining the notch for inserting an installation tool, and
an opening is defined by the notch and the two holes.

4. The fluid control valve unit according to claim 1, further comprising a filter member sandwiched between the end of the sleeve and the receiving part.

5. The fluid control valve unit according to claim 1, wherein the snap ring is formed in a flat plate shape extending in a direction perpendicular to the axis.

6. A fluid control valve unit comprising:
a fluid control valve comprising a sleeve in a bottomed cylindrical shape defining a predetermined axis, and a spool slidably accommodated in the sleeve in a direction of the axis;
a cylindrical passage member comprising an inner peripheral surface to which the sleeve is fitted, a receiving part annularly formed inside the cylindrical passage member and configured for receiving an end of the sleeve in the direction of the axis, and an annular groove recessed from the inner peripheral surface; and
a snap ring comprising a notch with a predetermined gap and fitted in the annular groove to be capable of restricting the fluid control valve accommodated in the passage member from falling off in the direction of the axis and to be capable of discharging fluid flowing through a discharge passage formed in the passage member,
wherein the sleeve comprises an inlet through which fluid flows, and a first communication port and a second communication port located on two sides of the inlet in the direction of the axis, and
the spool comprises a rod that reciprocates within the sleeve, a first valve portion that is provided on the rod to open and close a passage between the inlet and the first communication port, a second valve portion that is provided on the rod to open and close a passage between the inlet and the second communication port, and a biasing spring that exerts a biasing force in a direction to bring the first valve portion into contact with the snap ring.

7. The fluid control valve unit according to claim 6, wherein the discharge passage comprises:
a first discharge passage that communicates with the first communication port and is able to discharge fluid when the first valve portion is closed and that communicates with the second communication port and is able to discharge fluid when the second valve portion is closed; and
a second discharge passage that communicates with a region where the biasing spring is disposed and is able to discharge fluid.

8. The fluid control valve unit according to claim 6, wherein the spool comprises a compression spring disposed between the first valve portion and the second valve portion,
the first valve portion comprises:
a first fixed part fixed to the rod and having a first land capable of closing the first communication port and a first internal passage formed inside the first land; and
a first movable part movably supported along the rod and having a first lid part for opening and closing the first internal passage,
the second valve portion comprises:
a second fixed part fixed to the rod and having a second land capable of closing the second communication port and a second internal passage formed inside the second land; and
a second movable part movably supported along the rod and having a second lid part for opening and closing the second internal passage, and
the compression spring is disposed to exert a biasing force to close the first lid part and to close the second lid part.

9. A valve timing changing device for changing opening and closing timing of an intake valve or an exhaust valve driven by a camshaft, the valve timing changing device comprising:
a housing rotor that rotates coaxially with the camshaft;
a vane rotor that defines an advance chamber and a retard chamber together with the housing rotor and that rotates integrally with the camshaft; and
the fluid control valve unit according to claim 6 for controlling supply and discharge of hydraulic oil with respect to the advance chamber and the retard chamber,
wherein the inlet of the fluid control valve unit is a supply port to which hydraulic oil is supplied,
the first communication port of the fluid control valve unit is a retard port that communicates with the retard chamber, and
the second communication port of the fluid control valve unit is an advance port that communicates with the advance chamber.

10. The valve timing changing device according to claim 9, further comprising a fastening bolt that fastens the vane rotor to the camshaft,
wherein the fastening bolt is the passage member of the fluid control valve unit.

11. The valve timing changing device according to claim 9, wherein the fluid control valve of the fluid control valve unit is a torque-driven and hydraulically-driven fluid control valve capable of reciprocating hydraulic oil between the retard chamber and the advance chamber by a fluctuating torque received by the camshaft and discharging a part of the supplied hydraulic oil.

12. The valve timing changing device according to claim 11, wherein the spool is formed so that in a state where the spool is positioned in a retard mode in which the first valve portion is opened and the second valve portion is closed, when the camshaft receives a reverse torque, the second valve portion opens to allow hydraulic oil to flow from the advance port to the retard port, and
in a state where the spool is positioned in an advance mode in which the first valve portion is closed and the second valve portion is opened, when the camshaft receives a forward torque, the first valve portion opens to allow hydraulic oil to flow from the retard port to the advance port.

13. The valve timing changing device according to claim 12, wherein the spool is formed to block reciprocation of hydraulic oil between the retard chamber and the advance chamber in a state of being positioned in a neutral holding mode in which the first valve portion closes the retard port and the second valve portion closes the advance port.

* * * * *